US010397834B2

(12) United States Patent
Ye et al.

(10) Patent No.: US 10,397,834 B2
(45) Date of Patent: Aug. 27, 2019

(54) VOICE SERVICE HANDOVER METHOD AND APPARATUS IN SINGLE RADIO VOICE CALL CONTINUITY

(71) Applicant: Huawei Technologies Co., Ltd., Shenzhen (CN)

(72) Inventors: Yanglin Ye, Shenzhen (CN); Xiaobo Wu, Shanghai (CN); Weiwei Chong, Shanghai (CN); Tao Deng, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 202 days.

(21) Appl. No.: 15/394,286

(22) Filed: Dec. 29, 2016

(65) Prior Publication Data

US 2017/0111829 A1    Apr. 20, 2017

Related U.S. Application Data

(63) Continuation of application No. PCT/CN2014/081174, filed on Jun. 30, 2014.

(51) Int. Cl.
*H04W 36/00* (2009.01)
*H04W 36/14* (2009.01)
(Continued)

(52) U.S. Cl.
CPC ....... *H04W 36/0022* (2013.01); *H04W 36/14* (2013.01); *H04W 36/0016* (2013.01); *H04W 88/14* (2013.01); *H04W 88/16* (2013.01)

(58) Field of Classification Search
CPC ............. H04W 36/0022; H04W 36/14; H04W 36/0016; H04W 88/14; H04W 88/16
See application file for complete search history.

(56) References Cited

U.S. PATENT DOCUMENTS 8,675,609 B2    3/2014  Nishida et al.
2009/0270099 A1*  10/2009  Gallagher ............... H04W 8/08
                                                   455/435.1
(Continued)

FOREIGN PATENT DOCUMENTS

CN    101835223 A    9/2010
CN    103155645 A    6/2013
(Continued)

OTHER PUBLICATIONS

"3rd Generation Partnership Project; Technical Specification Group Services and System Aspects; Single Radio Voice Call Continuity (SRVCC); Stage 2 (Release 12)," 3GPP TS 23.216, V12.1.0, pp. 1-69, 3rd Generation Partnership Project, Valbonne, France (Jun. 2014).
(Continued)

*Primary Examiner* — Chi H Pham
*Assistant Examiner* — Weibin Huang
(74) *Attorney, Agent, or Firm* — Leydig, Voit & Mayer, Ltd.

(57) ABSTRACT

The present invention discloses a single radio voice call continuity handover method and apparatus. An MME records whether a bearer deletion request message sent by a gateway device is received, and if the MME determines that the bearer deletion request message is received, the MME does not send a bearer deletion instruction message to the gateway device, and does not delete a local voice service bearer resource. Therefore, after the MME performs voice service bearer deletion on an IMS side, the MME does not perform voice service bearer deletion on an EPS side, thereby avoiding a conflict in an SRVCC process. Alternatively, when a reason for session termination is SRVCC handover, a PCRF does not send a re-authentication request message to the gateway device, that is, the gateway device (Continued)

does not perform a voice bearer deletion process on the IMS side, thereby avoiding a conflict in an SRVCC process.

6 Claims, 17 Drawing Sheets

(51) Int. Cl.
*H04W 88/14* (2009.01)
*H04W 88/16* (2009.01)

(56) References Cited

U.S. PATENT DOCUMENTS

| | | | |
|---|---|---|---|
| 2010/0255808 A1* | 10/2010 | Guo | H04W 4/90 455/404.1 |
| 2011/0009120 A1* | 1/2011 | You | H04W 36/0022 455/436 |
| 2011/0191482 A1* | 8/2011 | Przybysz | H04L 12/14 709/228 |
| 2012/0057569 A1* | 3/2012 | Xie | H04W 36/0022 370/331 |
| 2012/0275432 A1* | 11/2012 | Lei | H04W 36/0022 370/331 |
| 2013/0051368 A1 | 2/2013 | Liu et al. | |
| 2013/0265988 A1 | 10/2013 | Nishida et al. | |
| 2013/0279475 A1* | 10/2013 | Nishida | H04W 36/14 370/331 |
| 2015/0223121 A1* | 8/2015 | Keller | H04W 36/0022 370/331 |

FOREIGN PATENT DOCUMENTS

| | | |
|---|---|---|
| CN | 103190179 A | 7/2013 |
| JP | 2010538504 A | 12/2010 |
| JP | 2012080424 A | 4/2012 |
| JP | 2013509746 A | 3/2013 |
| JP | 2013526194 A | 6/2013 |
| RU | 2507714 C2 | 2/2014 |

OTHER PUBLICATIONS

"3$^{rd}$ Generation Partnership Project; Technical Specification Group Services and System Aspects; General Packet Radio Service (GPRS) enhancements for Evolved Universal Terrestrial Radio Access Network (E-UTRAN) access (Release 12)," 3GPP TS 23.401, V12.5.0, pp. 1-305, 3$^{rd}$ Generation Partnership Project, Valbonne, France (Jun. 2014).

"Correction on SRVCC procedure for voice bearer deactivation," 3GPP TSG SA WG2 Meeting #81, Prague, Czech Republic, S2-104587, 3rd Generation Partnership Project, Valbonne, France (Oct. 11-15, 2010).

* cited by examiner

VOICE SERVICE HANDOVER METHOD AND APPARATUS IN SINGLE RADIO VOICE CALL CONTINUITY

CROSS-REFERENCE TO RELATED APPLICATIONS

This application is a continuation of International Application No. PCT/CN2014/081174, filed on Jun. 30, 2014, the disclosure of which is hereby incorporated by reference in its entirety.

TECHNICAL FIELD

Embodiments of the present invention relate to the communications field, and more specifically, to a single radio voice call continuity handover method and apparatus.

BACKGROUND

Single radio voice call continuity (SRVCC) is a voice over Long-Term Evolution (LTE) (VoLTE) service continuity solution proposed by the 3rd Generation Partnership Project (3GPP). The solution is mainly used to ensure voice service continuity when a voice service of VoLTE user equipment (UE) is handed over to a 2/3G circuit-switched (CS) domain.

FIG. 1A to FIG. 1C show a signaling interworking diagram of SRVCC in the prior art. As shown in FIG. 1A to FIG. 1C, in an SRVCC process, a mobile switching center (MSC) initiates an initial session handover process to an Internet Protocol (IP) multimedia subsystem (IMS) (step a1), and triggers the IMS to perform session handover and remote leg update (step a2), so as to hand over a voice session to a circuit-switched domain; on an IMS side, the session handover is completed, an IMS side access leg resource is released (step a3), and a session termination message is sent to a Policy and Charging Rules Function (PCRF) (step a4); the PCRF sends a re-authentication request message to a gateway device (step a5), where the message is used to instruct the gateway device to delete a voice bearer (that is, a bearer whose Quality of Service (QoS) Class Identifier (QCI) is equal to 1), and the gateway device is a gateway device that integrates a service gateway (SGW) and a packet data gateway (PGW); further, the gateway device sends a bearer deletion request message to a Mobility Management Entity (MME) (step a6) to request deletion of a voice service bearer. Likewise, in the SRVCC process, the VoLTE user equipment hands over an original voice service from an evolved packet system (EPS) network to a 2/3G network. After the handover is completed, the MME in the EPS network (that is, on an EPS side) sends a bearer deletion instruction message to the gateway device (step b12), where the message is used to request deletion of a bearer that is previously used for bearing a voice service, and the bearer refers to a bearer whose QCI is 1; after deleting a voice service bearer, the SGW/PGW initiates a bearer deletion request to the MME (step b13); after the voice service bearer is deleted, the MME sends a bearer deletion response to the SGW/PGW (step b14).

Based on the foregoing technical solution, in the SRVCC process, an original voice service bearer whose QCI is equal to 1 is deleted on both the EPS side and the IMS side. In addition, in the prior art, a time sequence for performing bearer deletion on the two sides is not defined. That is, in step a5, the gateway device receives the re-authentication request message sent by the PCRF and needs to perform an operation of deleting the voice service bearer, while in step b12, the MME sends the bearer deletion instruction message to the gateway device, and the gateway device also performs an operation of deleting the voice service bearer, which causes a conflict in the SRVCC process, and may even cause handover termination on the EPS side, and consequently the voice service is interrupted.

SUMMARY

Embodiments of the present invention provide a single radio voice call continuity handover apparatus and method, which can avoid a conflict in an SRVCC process.

According to a first aspect, a voice service handover method in SRVCC is provided, including: recording, by a MME, whether a bearer deletion request message sent by a gateway device is received; and receiving, by the MME, a prompt message that is sent by a MSC and indicates completion of handover from packet-switched (PS) to circuit-switched, and if the MME determines that the bearer deletion request message is received, a bearer deletion instruction message is not sent to the gateway device by the MME, and a local voice service bearer resource is not deleted by the MME.

With reference to the first aspect, in a first possible implementation manner, if the MME determines that the bearer deletion request message is not received, the MME sends a access bearer release request message to the gateway device, and deletes the local voice service bearer resource.

With reference to the first aspect, in a second possible implementation manner, before the recording, by an MME, whether a bearer deletion request message sent by a gateway device is received, the method includes: receiving, by the MME, the bearer deletion request message sent by the gateway device; and the method further includes: sending, by the MME, a bearer deletion response message to the gateway device, and the local voice service bearer resource is not deleted.

According to a second aspect, a voice service handover method in SRVCC is provided, including: receiving, by a PCRF unit, a session termination request message sent by an IMS, where the session termination request message includes an information element used to indicate that a reason for session termination is on-hook or SRVCC handover completion; and if the reason for session termination is SRVCC handover completion, a re-authentication request message is not sent to a gateway device by the PCRF.

With reference to the second aspect, in a first possible implementation manner of the second aspect, if the reason for session termination is on-hook, the PCRF sends the re-authentication request message to the gateway device.

According to a third aspect, a voice service handover method in SRVCC is provided, including: receiving, by an IMS, an initial session handover message sent by a MSC, performing session handover and remote leg update, and starting a delay timer; and before a delay time on the delay timer expires, receiving, by the IMS, a session interrupt request message sent by a PCRF unit, and releasing, by the IMS, an IMS access leg.

With reference to the third aspect, in a first possible implementation manner, the method further includes: in common SRVCC handover, configuring the delay timer on a Service Centralization and Continuity (SCC) application server (SCC AS) in the IMS; or in emergency SRVCC handover, configuring the delay timer on an emergency access transfer function (EATF) unit in the IMS.

With reference to the third aspect, in a second possible implementation manner, the delay time on the delay timer is greater than or equal to 8 seconds.

According to a fourth aspect, a voice service handover apparatus in SRVCC is provided, including: a processing module, configured to record whether a bearer deletion request message sent by a gateway device is received; and a receiving module, configured to receive a prompt message that is sent by a MSC and indicates completion of handover from packet-switched to circuit-switched; where the processing module is configured to: after the receiving module receives the prompt message that is sent by the MSC and indicates the completion of the handover from packet-switched to circuit-switched, if determining that the bearer deletion request message is received by the apparatus, a bearer deletion instruction message is not sent to the gateway device, and a local voice service bearer resource is not deleted.

With reference to the fourth aspect, in a first possible implementation manner, the processing module is further configured to: if determining that the bearer deletion request message is not received by the apparatus, an access bearer release request message is not sent to the gateway device, and the local voice service bearer resource is not deleted.

With reference to the fourth aspect, in a second possible implementation manner, the receiving module is further configured to receive the bearer deletion request message sent by the gateway device; and the processing module is further configured to: send a bearer deletion response message to the gateway device, and the local voice bearer resource is not deleted.

According to a fifth aspect, a voice service handover apparatus in SRVCC is provided, including: a receiving module, configured to receive a session termination request message sent by an IMS, where the session termination request message includes an information element used to indicate that a reason for session termination is on-hook or SRVCC handover completion; and a processing module, configured to: if determining that the reason for session termination is SRVCC handover completion, a re-authentication request message is not sent to a gateway device.

With reference to the fifth aspect, in a first possible implementation manner, the processing module is further configured to: if determining that the reason for session termination is on-hook, send the re-authentication request message to the gateway device.

According to a sixth aspect, a voice service handover apparatus in SRVCC is provided, including: a receiving module, configured to receive an initial session handover message sent by a MSC; and a processing module, configured to: after the initial session handover message is received, perform session handover and remote leg update, and start a delay timer; where: the receiving module is further configured to: before a delay time on the delay timer expires, receive a session interrupt request message sent by a PCRF unit; and the processing module is further configured to: after the session interrupt request message is received, release an IMS access leg.

With reference to the sixth aspect, in a first possible implementation manner, in common SRVCC handover, the delay timer is configured on an SCC AS of the apparatus; or in emergency SRVCC handover, the delay timer is configured on an EATF unit of the apparatus.

With reference to the sixth aspect or the first possible implementation manner of the sixth aspect, in a second possible implementation manner, the delay time on the delay timer is greater than or equal to 8 seconds.

Based on the single radio voice call continuity handover method and apparatus provided in the embodiments of the present invention, an MME records whether a bearer deletion request message sent by a gateway device is received; and if the MME determines that the bearer deletion request message is received, the MME does not send a bearer deletion instruction message to the gateway device, and does not delete a local voice service bearer resource. Therefore, after the MME performs voice service bearer deletion on an IMS side, the MME does not perform voice service bearer deletion on an EPS side, thereby avoiding a conflict in an SRVCC process. Alternatively, when a reason for session termination is SRVCC handover, a PCRF does not send a re-authentication request message to the gateway device, that is, an SRVCC handover process is completed on the IMS side without deleting a voice bearer on the gateway device, thereby avoiding a conflict in an SRVCC process. Alternatively, a delay timer is started on an IMS, and before a delay time expires, the IMS releases an IMS access leg after receiving a session interrupt request message sent by the PCRF, and does not initiate a voice bearer deletion process, thereby avoiding a conflict in an SRVCC process.

DESCRIPTION OF EMBODIMENTS

The following clearly describes the technical solutions in the embodiments of the present invention with reference to the accompanying drawings in the embodiments of the present invention. The described embodiments are some but not all of the embodiments of the present invention. All other embodiments obtained by a person of ordinary skill in the art based on the embodiments of the present invention without creative efforts shall fall within the protection scope of the present invention.

Figure 1A:
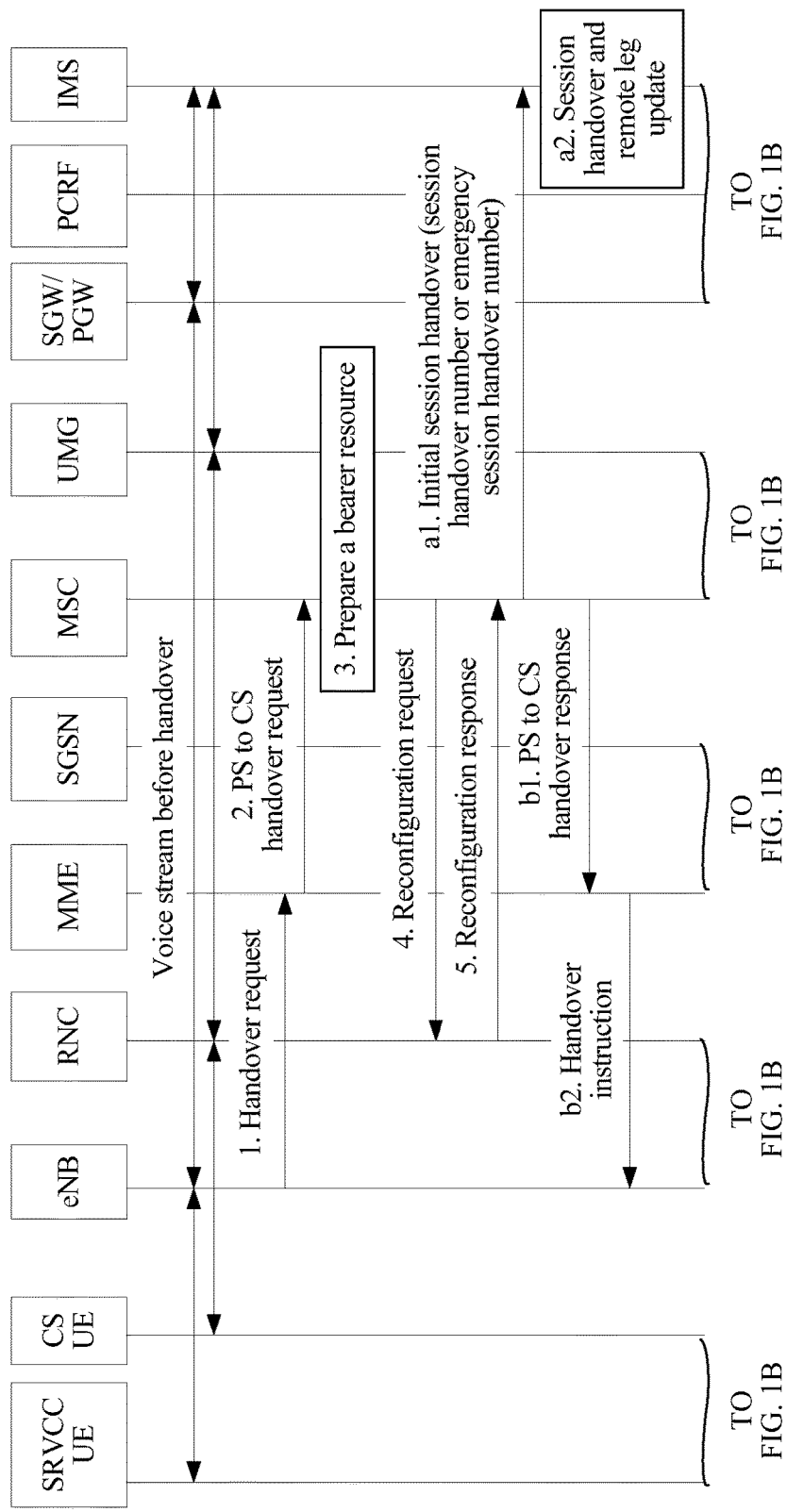
FIG. 1A to FIG. 1C show a signaling interworking diagram of an SRVCC process in the prior art.
Figure 1B:
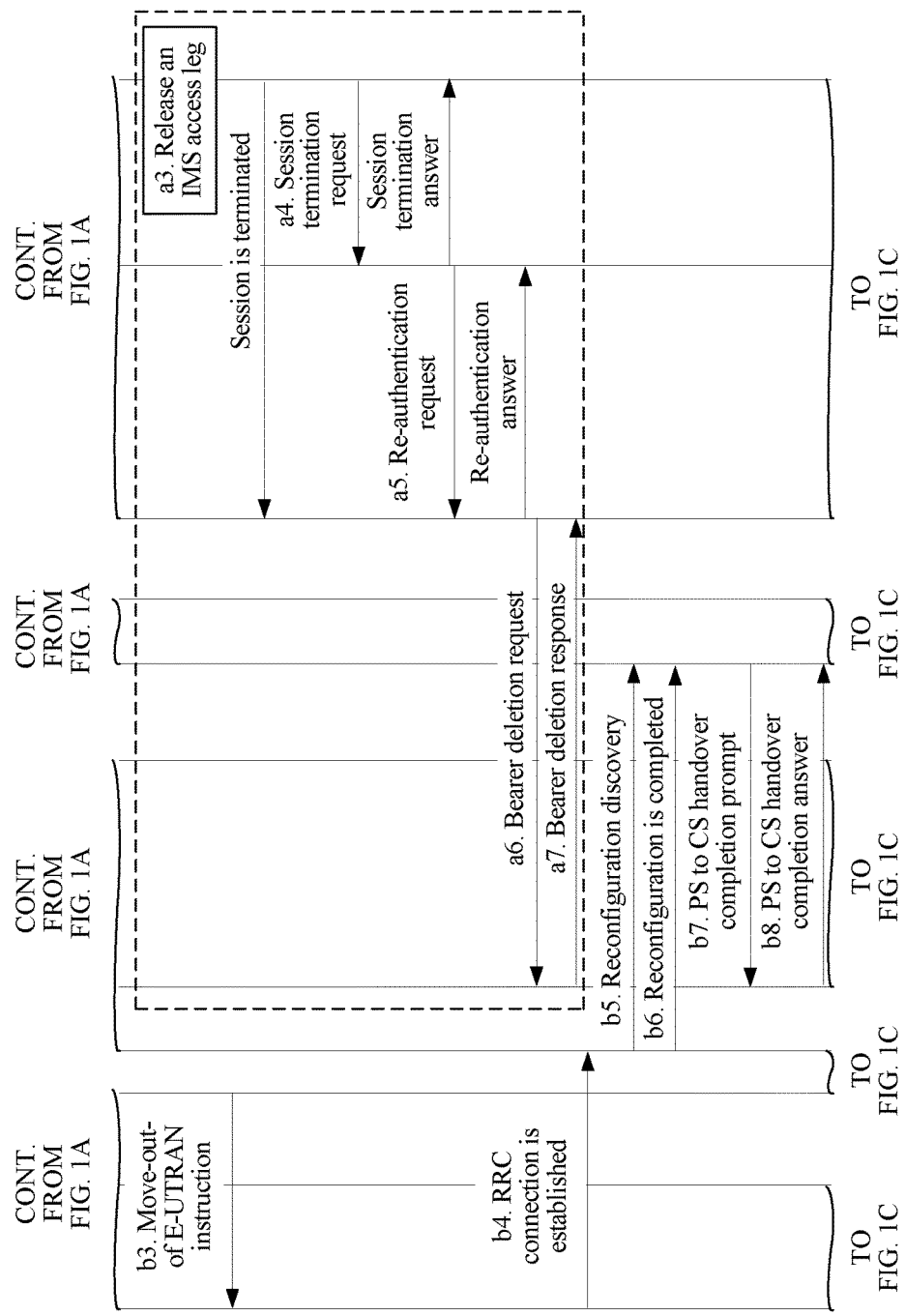
Figure 1C:
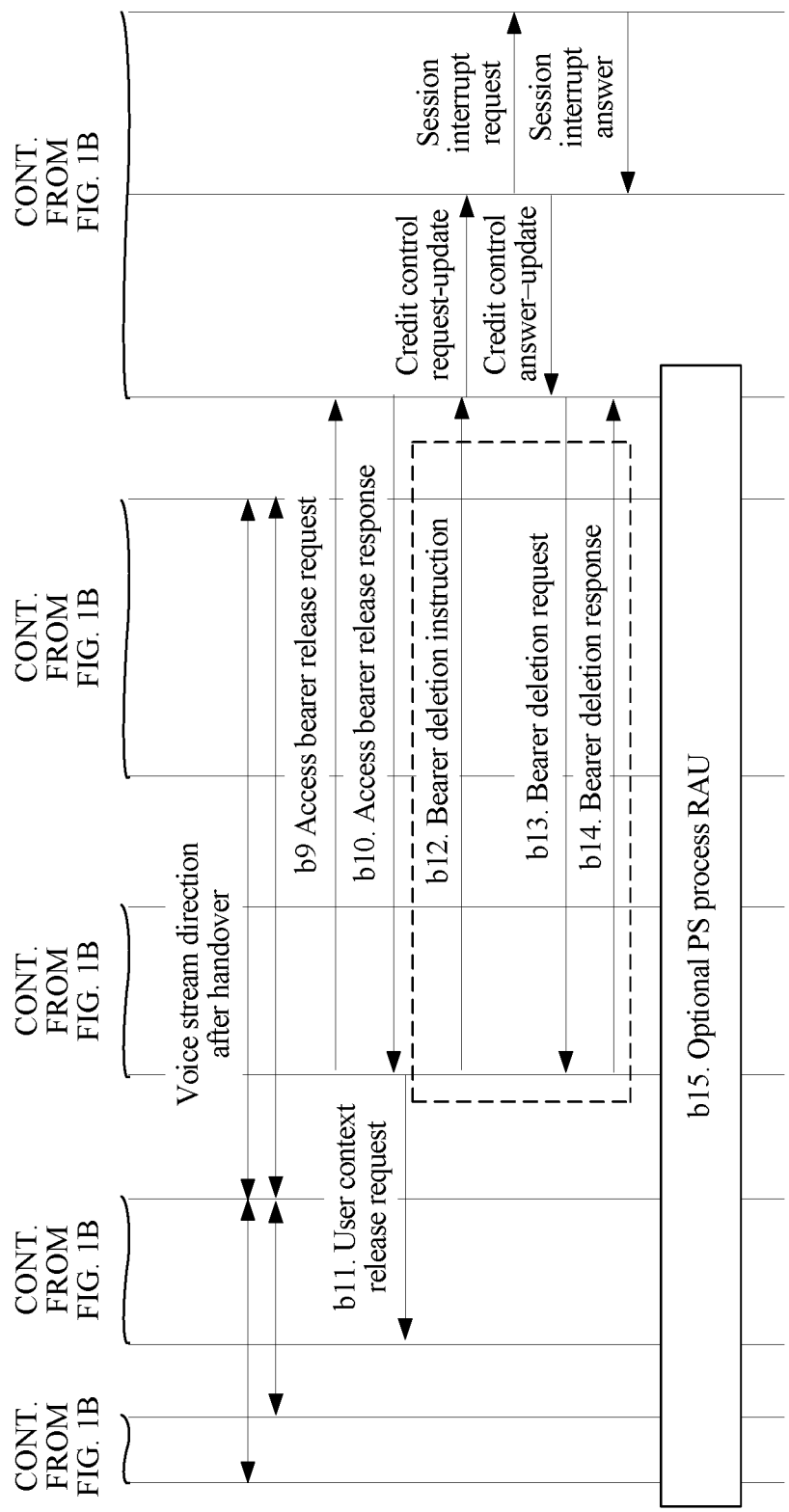
Figure 2:
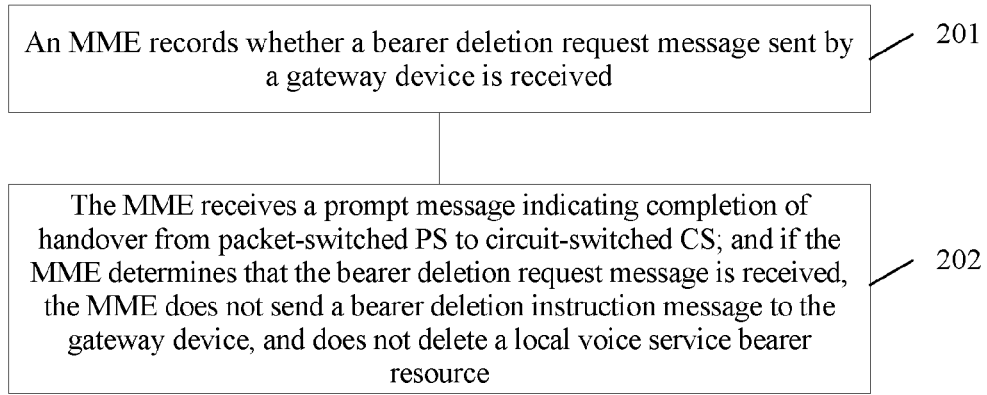
FIG. 2 shows a schematic flowchart of a single radio voice call continuity handover method according to an embodiment of the present invention.

FIG. 2 shows a schematic flowchart of a single radio voice call continuity handover method according to an embodiment of the present invention. The method may be executed by any proper apparatus, for example, executed by an MIME. However, the present invention is not limited thereto. As shown in FIG. 2, the method includes:

S201. An MME records whether a bearer deletion request message sent by a gateway device is received.

For example, the gateway device may be a gateway device that integrates an SGW and a PGW.

In an SRVCC process, a main process on an IMS side includes: an IMS completes session handover, releases an IMS side access leg resource, and sends a session termination message to a PCRF; the PCRF sends a re-authentication request message to the gateway device, where the message is used to instruct the gateway device to delete a voice bearer; further, the gateway device sends a bearer deletion request to the MME. In this case, the MME locally records a state indicating whether the bearer deletion request message is received, and sets an initial state: if the bearer deletion request message is not received, the initial state is recorded as false; or if the bearer deletion request message is received by the MME, the MME records the state as true. This embodiment of the present invention imposes no limitation on setting of the state.

The IMS in this embodiment of the present invention is a standard next-generation network architecture for a telecommunications operator who intends to provide mobile and fixed multimedia services. It uses Voice over IP (VoIP) execution that is executed based on Session Initiation Protocol (SIP) and 3GPP, and runs over the standard Internet Protocol. The IMS can support existing phone systems (both packet-switched and circuit-switched).

S202. The MME receives a prompt message indicating completion of handover from packet-switched to circuit-switched; and if the MME determines that the bearer deletion request message is received, the MME does not send a bearer deletion instruction message to the gateway device, and does not delete a local voice service bearer resource.

In the SRVCC process, the MME in an EPS network receives the prompt message indicating the completion of the handover from packet-switched to circuit-switched, and determines, according to whether the bearer deletion request message is received, whether to send the bearer deletion instruction message to the gateway device and delete the local voice service bearer resource.

According to the state set in S201, when the state is recorded as true, the MME does not send the bearer deletion instruction message to the gateway device, and does not delete the local voice service bearer resource. In this way, after receiving the bearer deletion request message sent by the gateway device, the MME deletes the voice service bearer resource, and the MME does not send the bearer deletion instruction message to the gateway device afterwards, thereby avoiding a conflict in an SRVCC process.

Optionally, if the MME determines that the bearer deletion request message is not received, the MME sends the bearer deletion instruction message to the gateway device. That is, the MME receives the packet-switched to circuit-switched handover completion prompt message, and when the state in the MME is recorded as false, the MME sends the bearer deletion instruction message to the gateway device. Therefore, the MME determines that the bearer deletion request message sent by the gateway device is not received, and sends the bearer deletion instruction message to the gateway device, thereby avoiding a conflict in the SRVCC process.

Optionally, the method further includes: receiving, by the MME, the bearer deletion request message sent by the gateway device; sending, by the MME, a bearer deletion response message to the gateway device, and the local voice service bearer resource is not deleted. In a scenario in which the MME receives the bearer deletion request message sent by the gateway device, the MME records that the bearer deletion request message sent by the gateway device is received, and the MME sends the bearer deletion response message to the gateway device, and does not delete the local voice service bearer resource.

Therefore, based on the technical solution provided in this embodiment of the present invention, after receiving a prompt message indicating completion of handover from packet-switched to circuit-switched, an MME determines, according to whether a bearer deletion request message sent by a gateway device is received by the MME, whether to send a bearer deletion instruction message to the gateway device. In this way, after the MME performs voice service bearer deletion on an IMS side, no voice service bearer deletion process is performed on an EPS side, thereby avoiding a conflict in an SRVCC process.

Figure 3A:
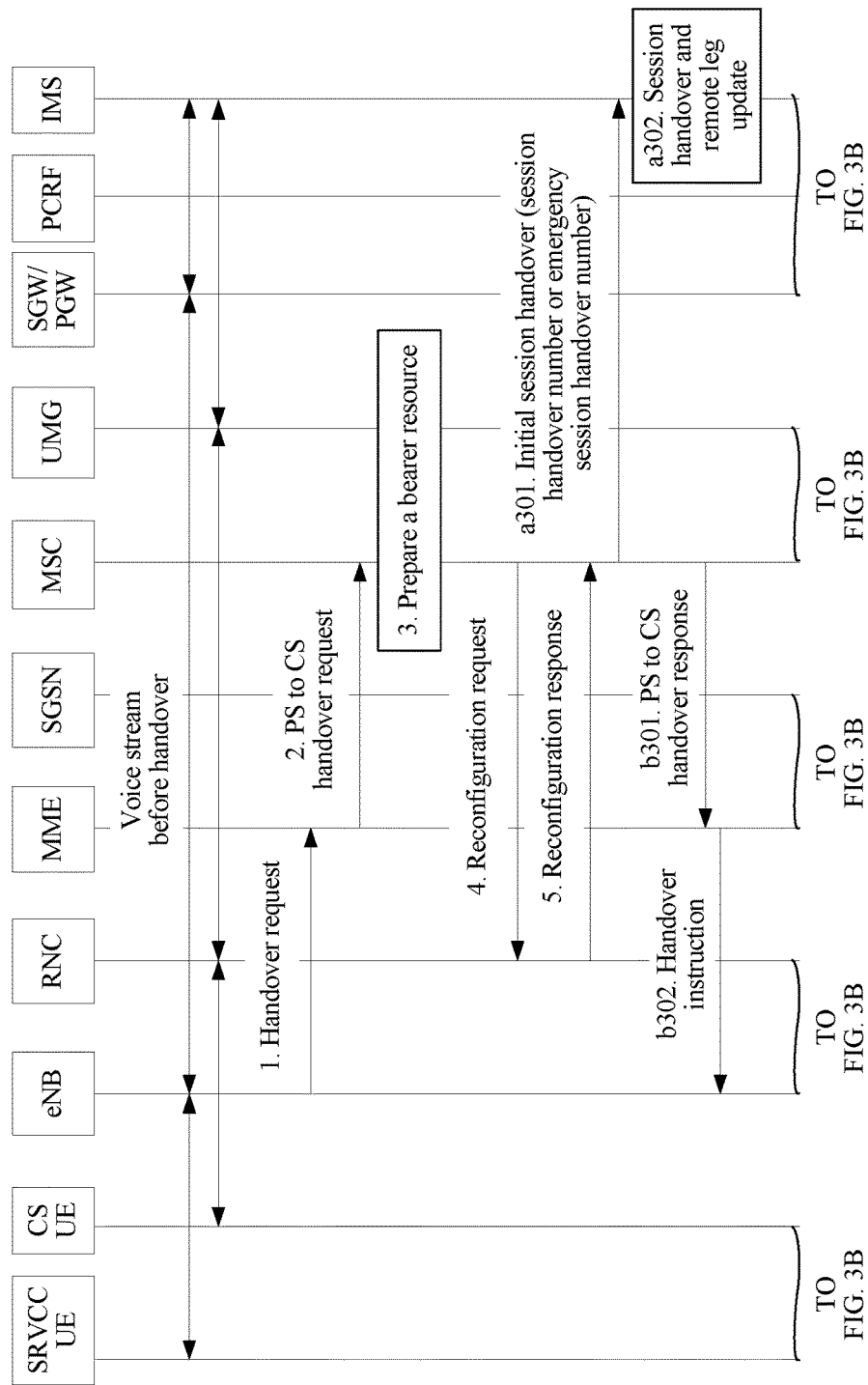
FIG. 3A to FIG. 3C show a signaling interworking diagram of a single radio voice call continuity handover method according to an embodiment of the present invention.
Figure 3B:
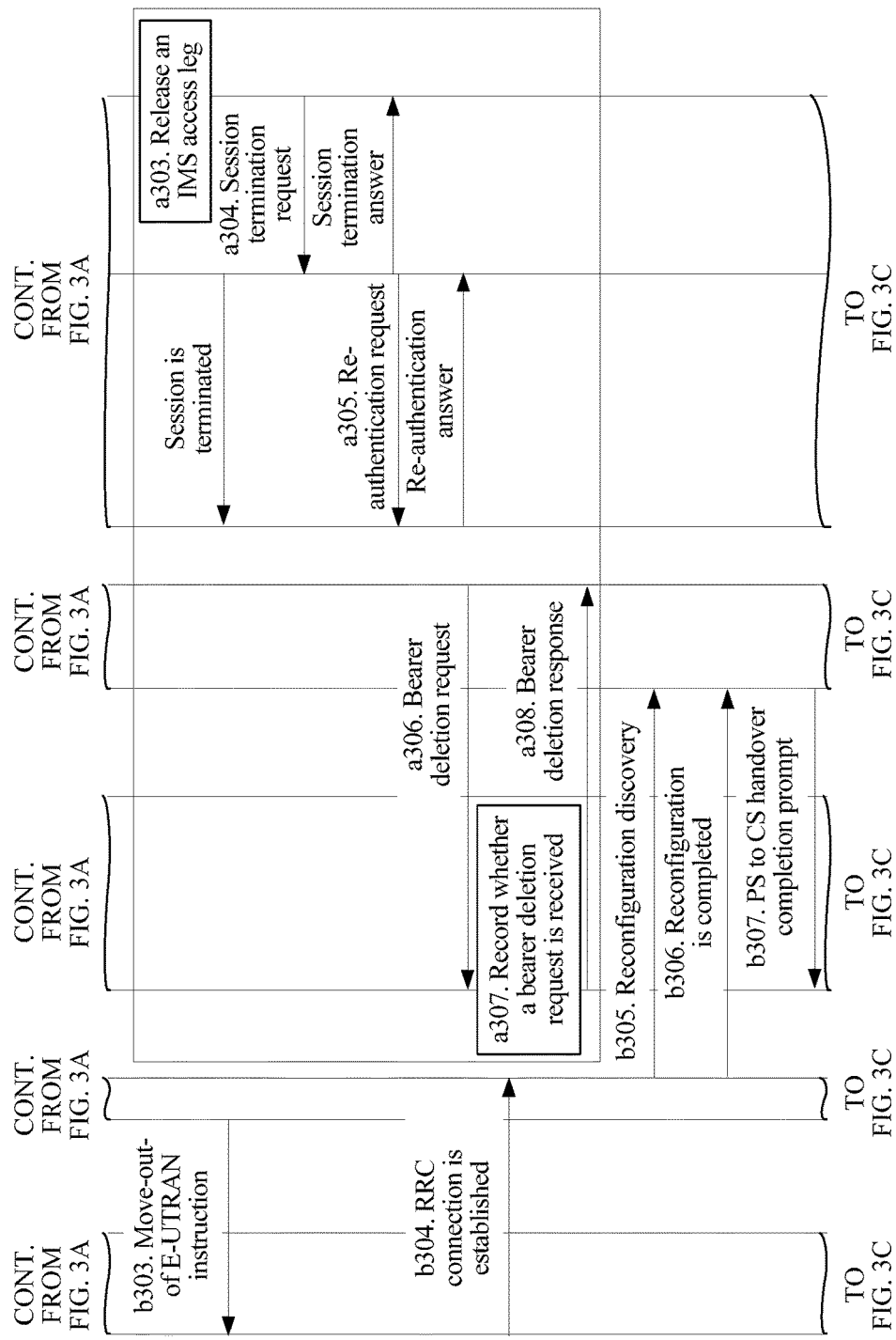
Figure 3C:
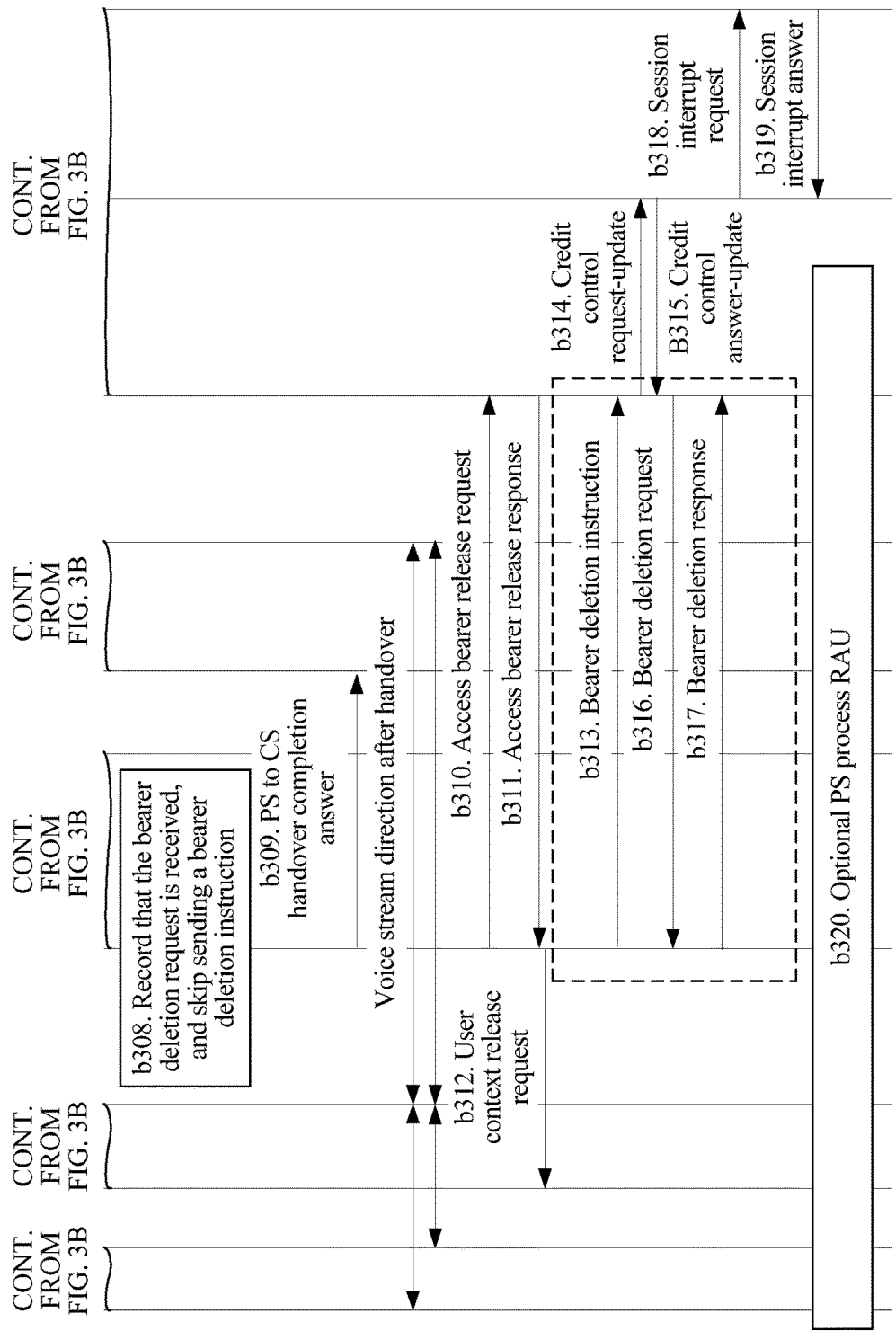

FIG. 3A to FIG. 3C show a signaling interworking diagram of a single radio voice call continuity handover method according to an embodiment of the present invention. The method may be executed by any proper apparatus, for example, executed by an MME. However, the present invention is not limited thereto. This embodiment of the present invention is a specific implementation manner of the embodiment of the present invention shown in FIG. 2.

In this embodiment of the present invention and another embodiment of the present invention, in an SRVCC handover process, an IMS side process includes a series of processes that are triggered after an MSC sends an initial session handover message to an IMS, an EPS side process includes a series of processes that are triggered after the MSC sends a packet-switched to circuit-switched handover response message to an MME. The IMS side process and the EPS side process are independent of each other.

As shown in FIG. 3A to FIG. 3C, this embodiment of the present invention includes:

In an SRVCC process, an IMS side process includes:

a301. An MSC sends an initial session handover message to an IMS.

a302. The IMS performs session handover and remote leg update.

a303. The IMS releases an IMS access leg.

a304. The IMS sends a session termination request message to a PCRF.

a305. The PCRF sends a re-authentication request message to a gateway device.

The PCRF sends the re-authentication request message to the gateway device, where the message is used to instruct the gateway device to delete a voice bearer.

a306. The gateway device sends a bearer deletion request message to an MME.

After deleting a voice bearer resource, the gateway device sends the bearer deletion request message to the MME, so as to request the MME to delete a voice service bearer.

a307. The MME records whether the bearer deletion request message sent by the gateway device is received.

Specifically, for example, if the bearer deletion request message is received by the MME, the MME records an initial state as true; or if the bearer deletion request message is not received by the MME, the MME records the initial state as false.

For example in a306, the bearer deletion request message sent by the gateway device is received by the MME; in this case, the MME records the state as true, and does not delete a local voice service bearer.

a308. The MME sends a bearer deletion response message to the gateway device.

In the SRVCC process, an EPS network side process includes:

b301. The MSC sends a packet-switched to circuit-switched handover response message to the MME.

b302. The MME sends a handover instruction message to an Evolved Node B (eNB).

b303. The eNB sends a mobility from Evolved Universal Mobile Telecommunications Service (UMTS) Terrestrial Radio Access Network (E-UTRAN) command to UE.

b304. A Radio Resource Control (RRC) connection is established between the UE and a Radio Network Controller (RNC).

b305. The RNC performs reconfiguration discovery.

b306. Reconfiguration between the RNC and the MSC is completed.

b307. The MSC sends, to the MME, a packet-switched to circuit-switched handover completion prompt message.

b308. The MME determines that the bearer deletion request message sent by the gateway device is received, and the MME does not send a bearer deletion instruction message to the gateway device, and does not delete a local voice service bearer resource. by now, the MME does not send the bearer deletion instruction message to the gateway device, and does not initiate a bearer deletion process, the EPS network side process ends, and no subsequent processing process is performed.

Specifically, for example, in a306, the bearer deletion request message sent by the gateway device is received by the MME; in this case, the MME determines, according to a previous record, that the bearer deletion request message sent by the gateway device is received, and the MME does not send the bearer deletion instruction message to the gateway device, and does not delete the local voice service bearer resource.

In this way, the MME records that the bearer deletion request message sent by the gateway device is received; after receiving the packet-switched to circuit-switched handover completion prompt message, the MME determines that the bearer deletion request message sent by the gateway device is received, and does not initiate the bearer deletion process, thereby avoiding a process conflict caused by repeated deletions of the voice bearer resource in the SRVCC process.

In another scenario of this embodiment of the present invention, that is, in the IMS side process of the SRVCC process, if the bearer deletion request message sent by the gateway device is not received by the MME, b308 and subsequent steps in the EPS side process are:

b308. The MME determines that the bearer deletion request message sent by the gateway device is not received.

b309. The MME sends a packet-switched to circuit-switched handover completion answer message to the MSC.

b310. The MME sends an access bearer release request message to the gateway device.

b311. The gateway device sends an access bearer release response message to the MME.

b312. The MME sends a bearer context release request message to the eNB.

b313. The MME sends the bearer deletion instruction message to the gateway device.

The bearer deletion instruction message is used to instruct the gateway device to delete the voice service bearer resource.

b314. The gateway device sends a credit control update request message to the PCRF.

The credit control update request message is used to notify the PCRF that the gateway device needs to delete the voice service bearer.

b315. The PCRF sends a credit control update answer message to the gateway device.

The PCRF sends the credit control update answer message to the gateway device, and agrees with the gateway device to delete the voice service bearer.

b316. The gateway device sends a bearer deletion request message to the MME.

The gateway device deletes a local voice service bearer, and sends the bearer deletion request message to the MME, to request the MME to delete the voice service bearer resource.

b317. The MME sends a bearer deletion response message to the gateway device.

After deleting the local voice service bearer resource, the MME sends the bearer deletion response message to the gateway device. On the foregoing basis that the bearer deletion request message is not received by the foregoing MME, no process conflict occurs when the MME deletes the local voice service bearer resource herein.

b318. The PCRF sends a session interrupt request message to the IMS.

The session interrupt request message is used to notify the IMS device of the SRVCC handover completion.

For example, after receiving the credit control update request message sent by the gateway device in b314, the PCRF sends the session interrupt request message to the IMS.

There is no sequence between b318 to b319 and b316 to b317.

b319. The IMS sends a session interrupt answer message to the PCRF.

After receiving the session interrupt request message, the IMS performs voice service bearer resource deletion.

After the IMS receives the session interrupt request message sent by the PCRF, the foregoing operations in a304 to a308 are not performed.

b320. Perform an optional packet-switched process.

Therefore, based on the technical solution provided in this embodiment of the present invention, after receiving a prompt message indicating completion of handover from packet-switched to circuit-switched, an MME determines, according to a record that a bearer deletion request message sent by a gateway device is received by the MME, not to send a bearer deletion instruction message to the gateway device. In this way, after the MME performs voice service bearer deletion on an IMS side, no voice service bearer deletion process is performed on an EPS side, thereby avoiding a conflict in an SRVCC process.

Figure 4:
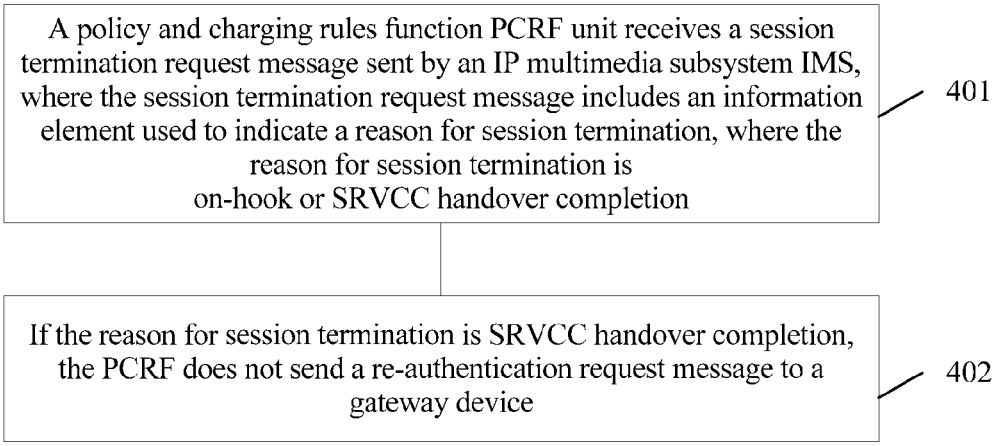
FIG. 4 shows a schematic flowchart of a single radio voice call continuity handover method according to an embodiment of the present invention.

FIG. 4 shows a schematic flowchart of a single radio voice call continuity handover method according to an embodiment of the present invention. The method may be executed by any proper apparatus, for example, executed by a PCRF. However, the present invention imposes no limitation thereon. As shown in FIG. 4, the method includes:

S401. A PCRF unit receives a session termination request message sent by an IMS, where the session termination request message includes an information element used to indicate a reason for session termination, where the reason for session termination is on-hook or SRVCC handover completion.

S402. If the reason for session termination is SRVCC handover completion, the PCRF does not send a re-authentication request message to a gateway device.

Optionally, if the reason for session termination is on-hook, the PCRF sends a re-authentication request message to the gateway device.

Based on the technical solution provided in this embodiment of the present invention, when an SRVCC handover process is performed, on the basis that a received session termination request message includes an information element used to indicate a reason for session termination, if a PCRF determines that the reason for session termination is SRVCC handover, the PCRF does not send a re-authentication request message to a gateway device. That is, no voice service bearer deletion process is performed on an IMS side, thereby avoiding a process conflict in SRVCC handover.

Figure 5A:
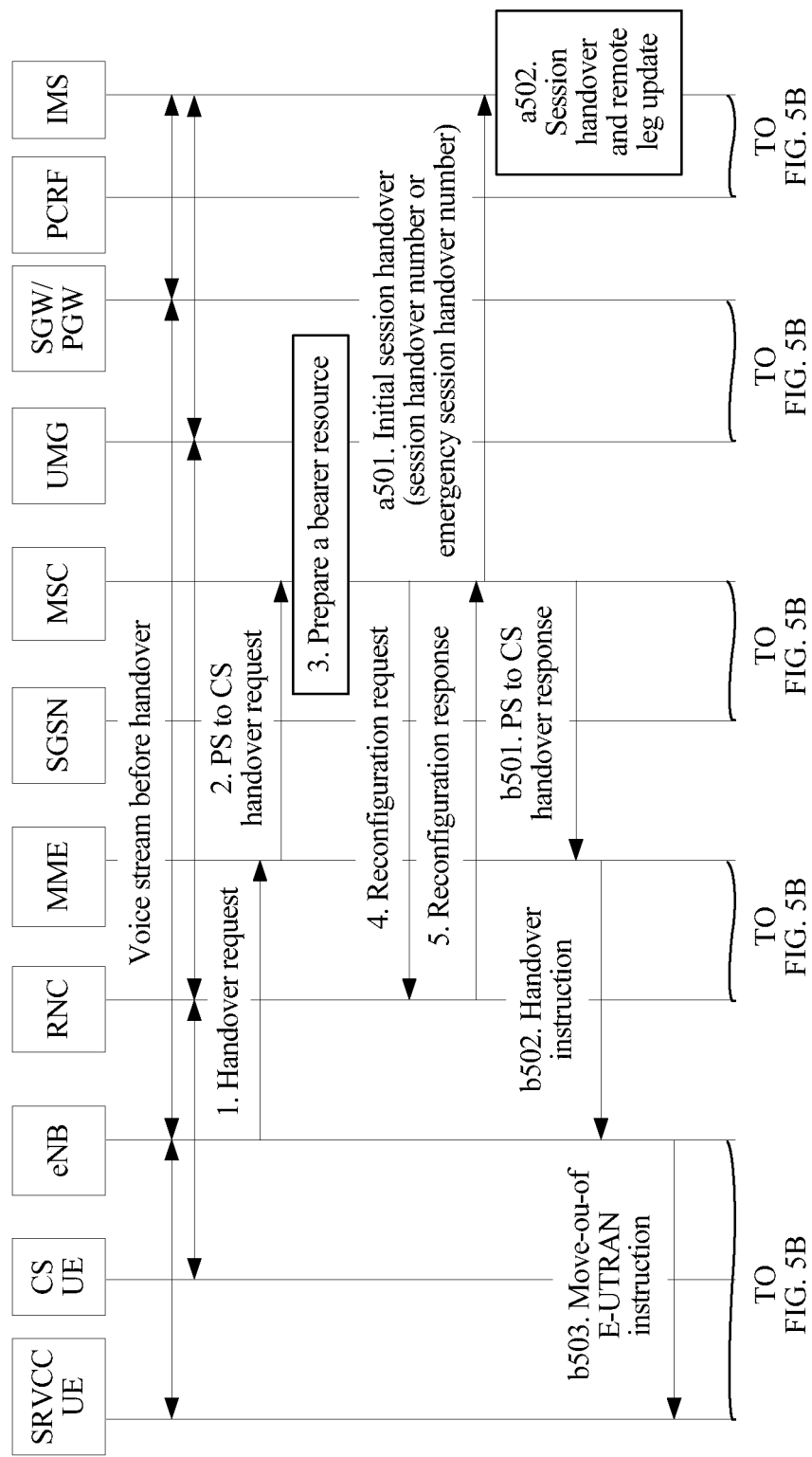
FIG. 5A to FIG. 5C show a signaling interworking diagram of a single radio voice call continuity handover method according to an embodiment of the present invention.
Figure 5B:
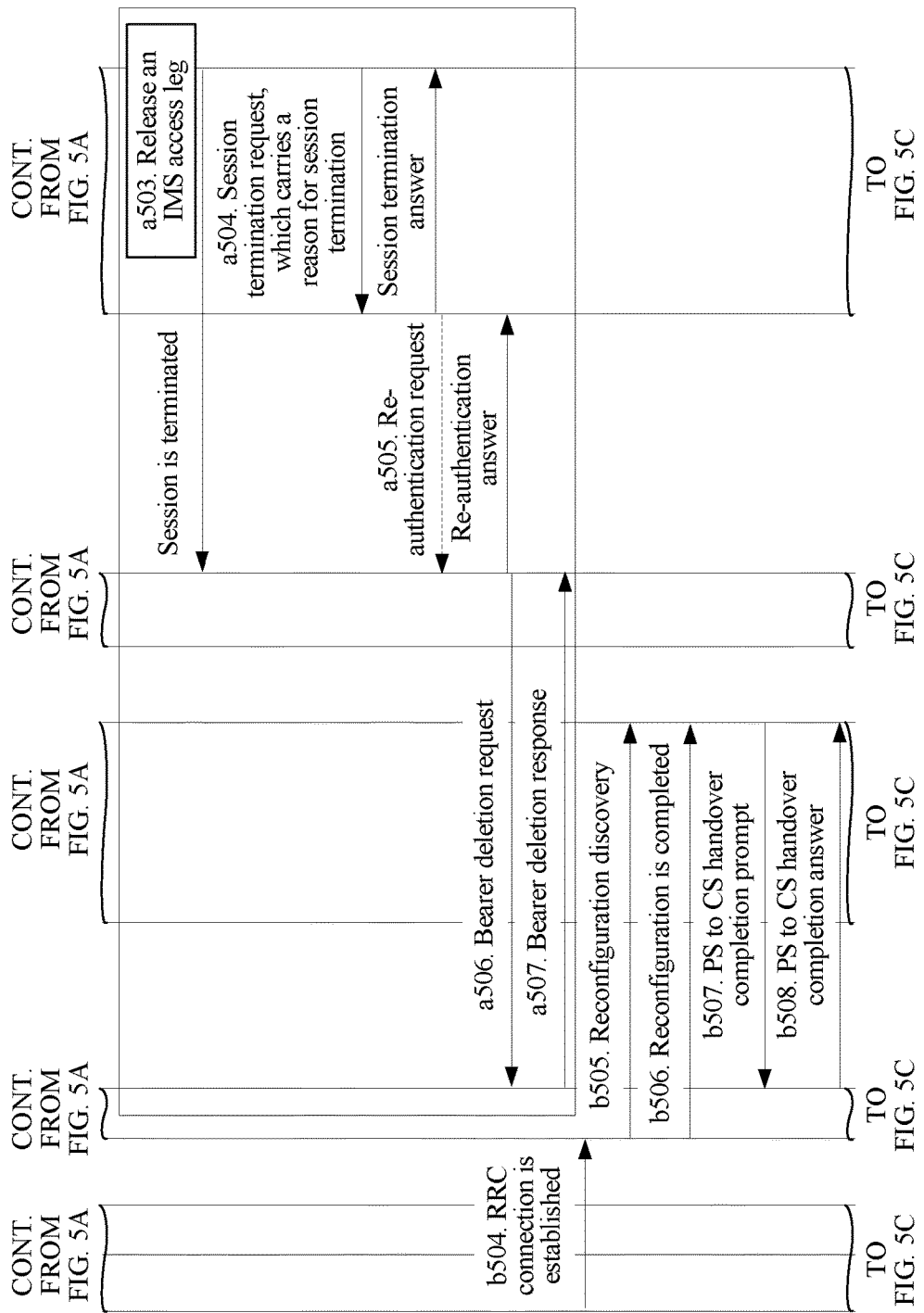
Figure 5C:
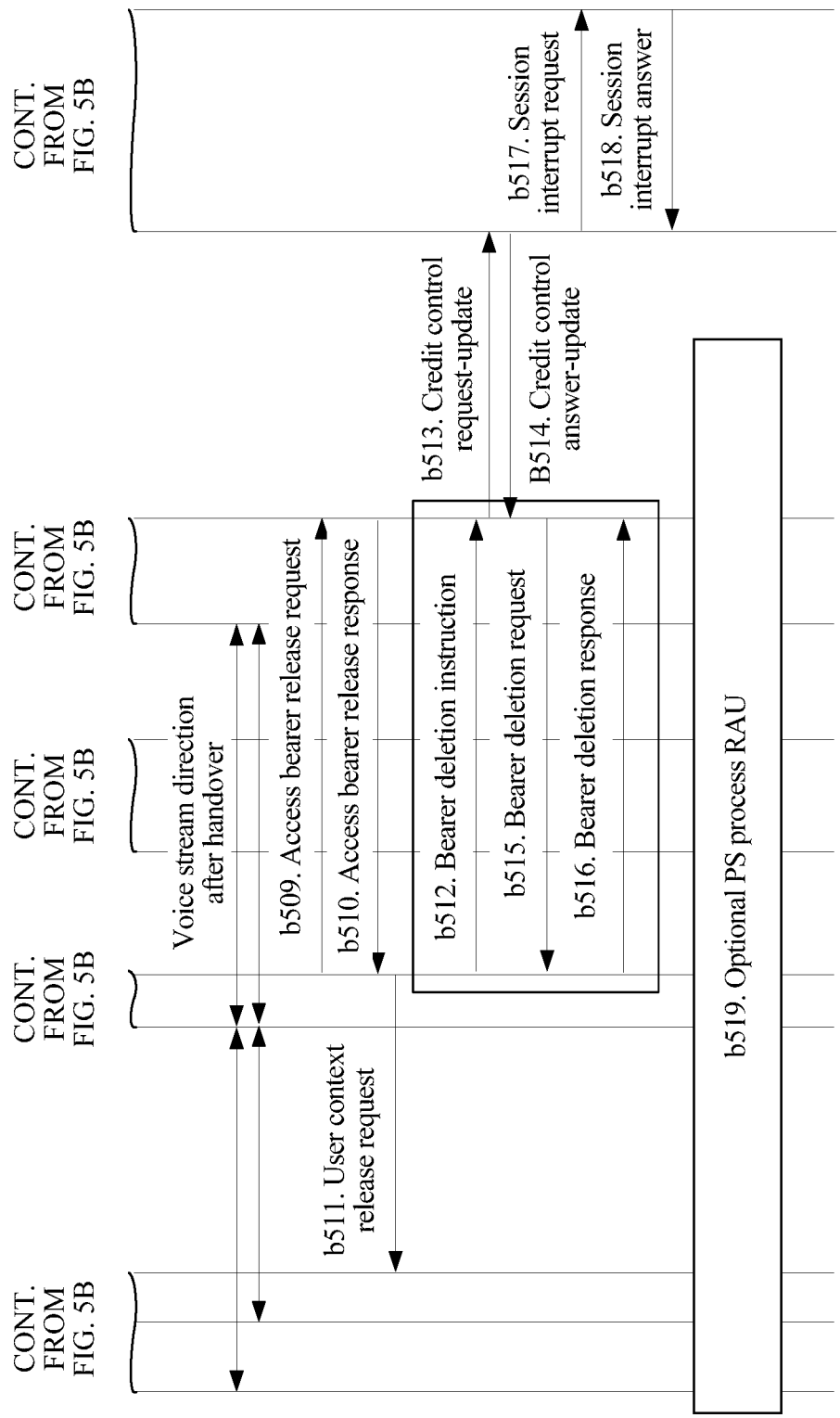

FIG. 5A to FIG. 5C show a signaling interworking diagram of a single radio voice call continuity handover method according to an embodiment of the present invention. The method may be executed by any proper apparatus, for example, executed by a PCRF. However, the present invention is not limited thereto. This embodiment of the present invention is a specific implementation method of the embodiment of the present invention shown in FIG. 4.

As shown in FIG. 5A to FIG. 5C, this embodiment of the present invention includes:

In an SRVCC process, an IMS side process includes:

a501 to a503: refer to a301 to a303 in FIG. 3A to FIG. 3C.

a504. An IMS sends a session termination request message to a PCRF.

This step specifically includes: the IMS sends the session termination request message to the PCRF, where the session termination request message includes an information element used to indicate a reason for session termination, where the reason for session termination is on-hook or SRVCC handover completion. If the PCRF determines that the reason for session termination is on-hook, the PCRF sends a re-authentication request message to a gateway device. If the PCRF determines that the reason for session termination is SRVCC handover completion, no re-authentication request message is sent to the gateway device, that is, no voice bearer deletion process is initiated, and no subsequent process is performed.

In the SRVCC process, an EPS network side process includes:

b501 to b507: refer to b301 to b307 in FIG. 3A to FIG. 3C; and b508 to b511: refer to b309 to b312 in FIG. 3A to FIG. 3C.

b512. An MME sends a bearer deletion instruction message to a gateway device.

b513. The gateway device sends a credit control update request message to the PCRF.

The credit control update request message is used to notify the PCRF that the gateway device needs to delete a voice service bearer.

b514. The PCRF sends a credit control update answer message to the gateway device.

The PCRF sends the credit control update answer message to the gateway device, and agrees with the gateway device to delete the voice service bearer.

b515. The gateway device sends a bearer deletion request message to the MIME.

The gateway device deletes a local voice service bearer, and sends the bearer deletion request message to the MME, to request the MME to delete a voice service bearer resource.

b516. The MME sends a bearer deletion response message to the gateway device.

After deleting a local voice service bearer resource, the MME sends the bearer deletion response message to the gateway device.

In this way, when the PCRF determines that the reason for session termination is SRVCC handover completion, no re-authentication request message is sent to the gateway device, that is, no voice bearer deletion process is performed. That is, in the SRVCC process, no voice bearer deletion process is initiated on the IMS side, and the MME initiates the voice bearer deletion process only on the EPS side, thereby avoiding a process conflict in SRVCC handover.

b517. The PCRF sends a session interrupt request message to the IMS.

For example, after receiving the credit control update request message sent by the gateway device in b513, the PCRF sends the session interrupt request message to the IMS.

There is no sequence between b517 to b518 and b515 to b516.

b518. The IMS sends a session interrupt answer message to the PCRF.

b519. Perform an optional packet-switched process.

Therefore, based on the technical solution provided in this embodiment of the present invention, an IMS sends a session termination request message to a PCRF, where the session termination request message includes an information element used to indicate that a reason for session termination is on-hook or SRVCC handover completion. If the PCRF determines that the reason for session termination is on-hook, the PCRF sends a re-authentication request message to a gateway device. If the PCRF determines that the reason for session termination request is SRVCC handover completion, no re-authentication request message is sent to the gateway device, that is, no voice bearer deletion process is initiated. In this way, a process conflict is avoided when a voice service bearer deletion process is initiated on both an IMS side and an EPS side in an SRVCC process.

In another scenario of this embodiment of the present invention, if the PCRF determines that the reason for session termination is on-hook, the PCRF sends a re-authentication request message to the gateway device, that is:

a505. The PCRF sends the re-authentication request message to the gateway device.

The PCRF receives the session termination request message sent by the IMS, if the session termination request message includes the information element used to indicate that the reason for session termination is on-hook, the PCRF returns a session termination answer message to the IMS, and sends the re-authentication request message to the gateway device.

a506. The gateway device sends the bearer deletion request message to the MME.

After receiving the re-authentication request message sent by the PCRF, the gateway device sends a re-authentication answer to the PCRF, and sends the bearer deletion request message to the MME.

a507. The MME sends the bearer deletion response message to the gateway device.

In this case, the EPS network side process includes:

b501 to b507: refer to b301 to b307 in FIG. 3A to FIG. 3C; and b508 to b511: refer to b309 to b312 in FIG. 3A to FIG. 3C.

b512. The MME sends a bearer deletion instruction message to the gateway device.

b513. The gateway device sends a credit control update request message to the PCRF.

The credit control update request message is used to notify the PCRF that the gateway device needs to delete a voice service bearer.

b514. The PCRF sends a credit control update answer message to the gateway device.

The PCRF sends the credit control update answer message to the gateway device, and agrees with the gateway device to delete the voice service bearer.

b515. The gateway device sends a bearer deletion request message to the MME.

The gateway device deletes a local voice service bearer, and sends the bearer deletion request message to the MME, to request the MME to delete a voice service bearer resource.

b516. The MME sends a bearer deletion response message to the gateway device.

After deleting a local voice service bearer resource, the MME sends the bearer deletion response message to the gateway device. Because the reason for session termination is on-hook instead of an SRVCC process conflict, and user equipment is in an on-hook state, producing no adverse effect such as handover interruption.

b517. The PCRF sends a session interrupt request message to the IMS.

b518. The IMS sends a session interrupt answer message to the PCRF.

b519. Perform an optional packet-switched process.

Therefore, based on the technical solution provided in this embodiment of the present invention, an IMS sends a session termination request message to a PCRF, if the session termination request message includes an information element used to indicate a reason for session termination is on-hook, the PCRF sends a re-authentication request message to a gateway device. If the PCRF determines that the reason for session termination request is SRVCC handover completion, no re-authentication request message is sent to the gateway device, that is, no voice bearer deletion process is initiated. In this way, a process conflict is avoided when a voice service bearer deletion process is initiated on both an IMS side and an EPS side in an SRVCC process.

Figure 6:
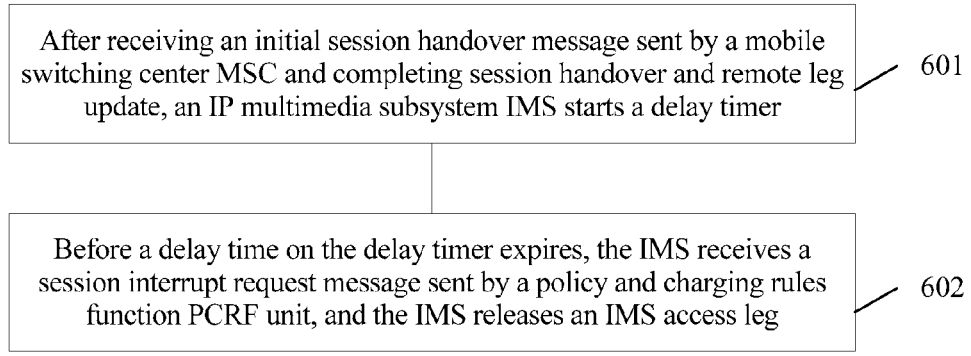
FIG. 6 shows a schematic flowchart of a single radio voice call continuity handover method according to an embodiment of the present invention.

FIG. 6 shows a schematic flowchart of a single radio voice call continuity handover method according to an embodiment of the present invention. The method may be executed by any proper apparatus, for example, executed by an IMS. However, the present invention imposes no limitation thereon.

As shown in FIG. 6, the method includes:

S601. After receiving an initial session handover message sent by a MSC and completing session handover and remote leg update, an IMS starts a delay timer.

Specifically, in common SRVCC handover, the delay timer is configured on an SCC AS in the IMS; or in emergency call SRVCC handover, the delay timer is configured on an EATF unit in the IMS.

A delay time set on the delay timer is 8 seconds It is recommended in a protocol that an SRVCC process needs to be completed within 300 ms. Considering that a delay of message retransmission in an abnormal scenario is 7 seconds, it is recommended that a delay time set on the delay timer is 8 seconds.

S602. Before a delay time on the delay timer expires, the IMS receives a session interrupt request message sent by a PCRF unit, and the IMS releases an IMS access leg.

That is, before the delay time on the delay timer expires, in an SRVCC handover process, an EPS side handover process is completed. After the IMS receives the session interrupt request message sent by the PCRF unit and releases the IMS access leg, an SRVCC process on an IMS side is completed.

Therefore, based on the technical solution provided in this embodiment of the present invention, in an SRVCC process, on an IMS side, an IMS starts a delay timer before releasing an IMS access leg; during a delay process according to the delay timer, a voice service bearer deletion process is performed on an EPS side; before a delay time set on the delay timer expires, the IMS receives a session interrupt request message sent by a policy and charging rules function PCRF unit, releases the IMS access leg, and does not perform the voice service bearer deletion process. Therefore, in the SRVCC handover process, the voice service bearer deletion process is performed only on the EPS side, thereby avoiding a process conflict in SRVCC handover.

Figure 7A:
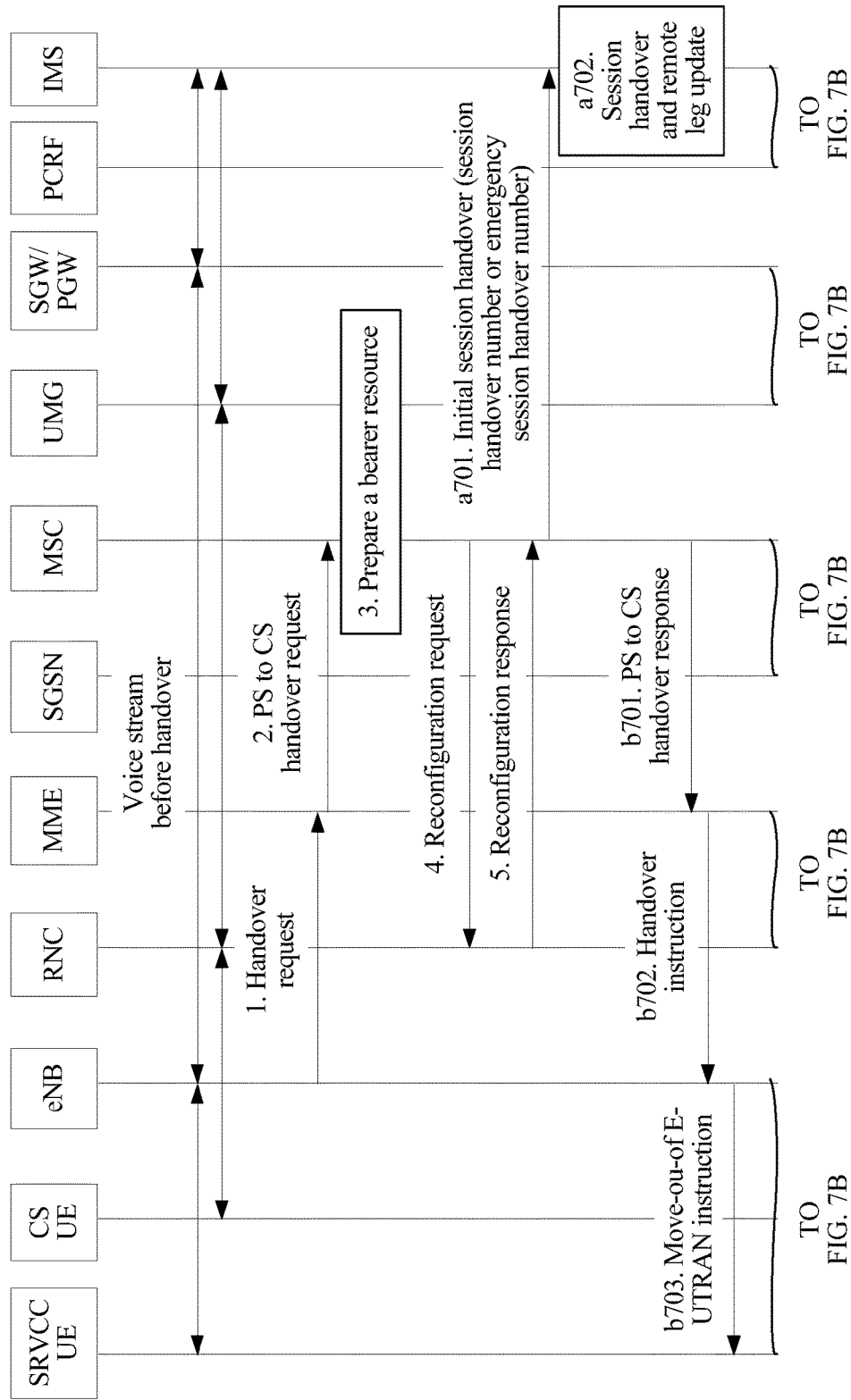
FIG. 7A to FIG. 7C show a signaling interworking diagram of a single radio voice call continuity handover method according to an embodiment of the present invention.
Figure 7B:
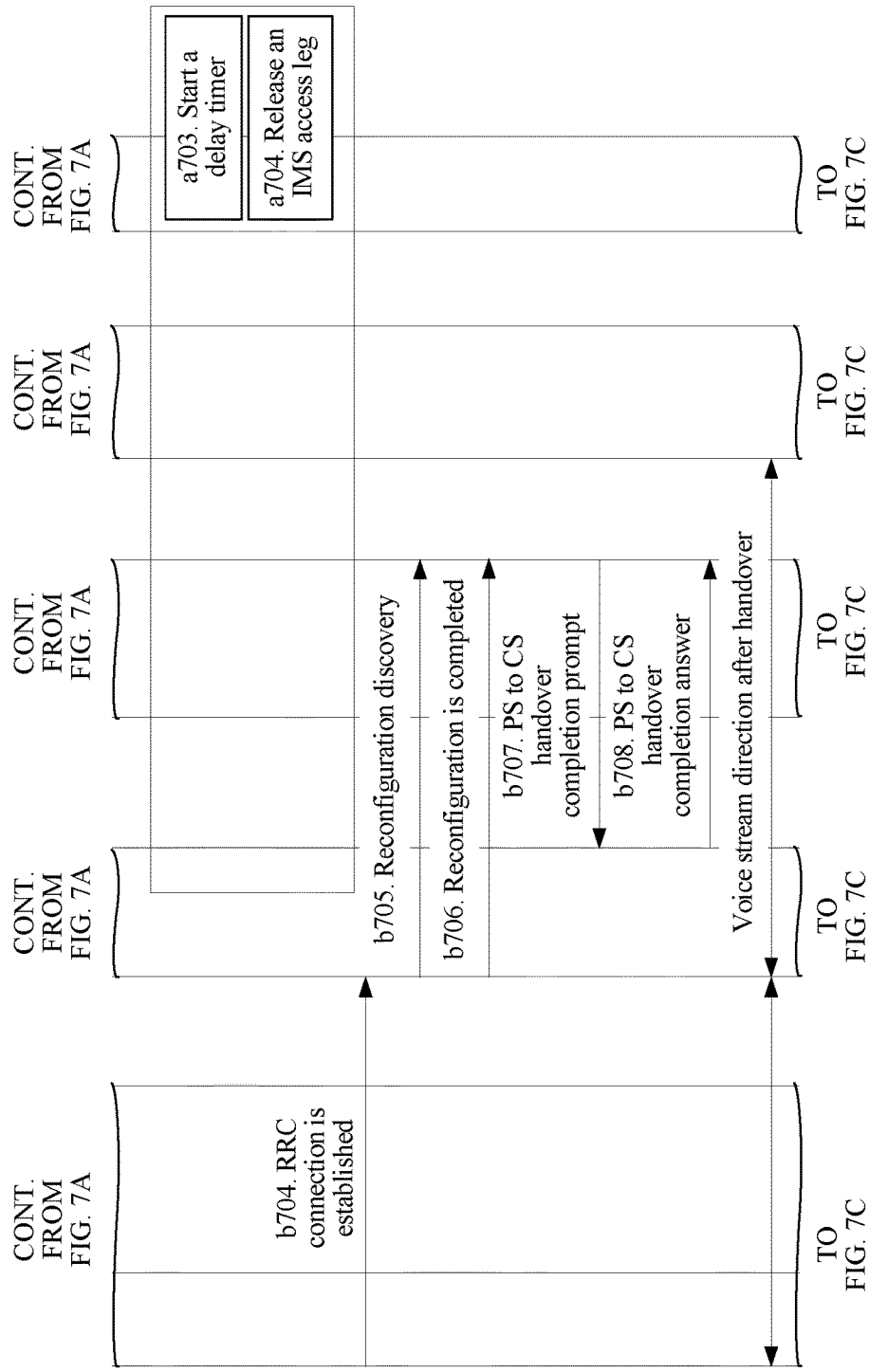
Figure 7C:
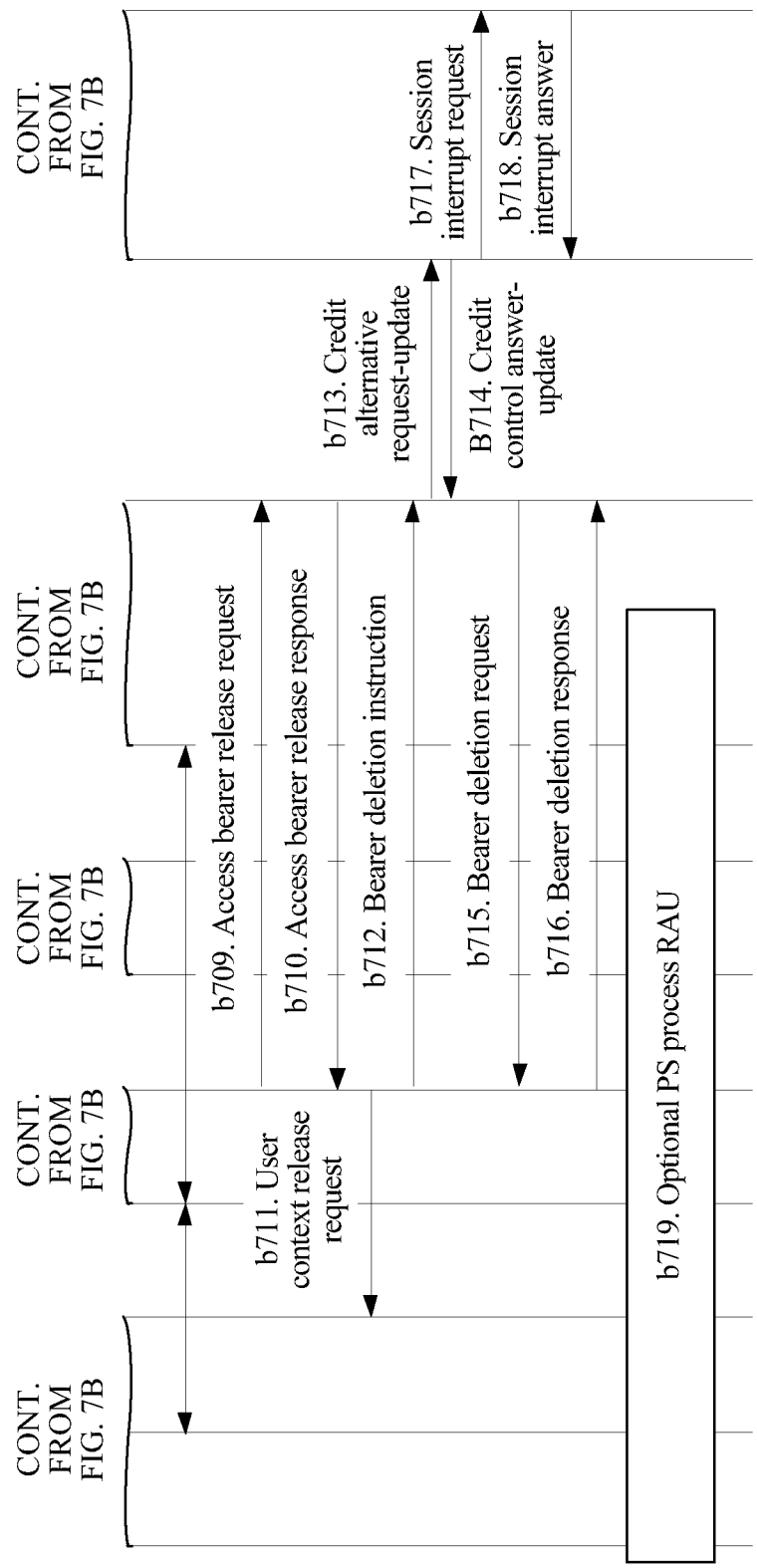

FIG. 7A to FIG. 7C show a signaling interworking diagram of a single radio voice call continuity handover method according to an embodiment of the present invention. This embodiment of the present invention is a specific implementation manner of the embodiment of the present invention shown in FIG. 6.

As shown in FIG. 7A to FIG. 7C, this embodiment of the present invention includes:

a701. An MSC sends an initial session handover message to an IMS.

a702. The IMS performs session handover and remote leg update.

a703. The IMS starts a delay timer.

On the basis that in common SRVCC handover and emergency SRVCC handover, logical network elements initiating session release in the IMS are different, in the common SRVCC handover, the delay timer is configured on an SCC AS in the IMS; in the emergency SRVCC handover, the delay timer is configured on an EATF in the IMS. A delay time set on the delay timer may be 8 seconds, and the present invention imposes no limitation thereon.

a704. The IMS releases an IMS access leg.

Before the delay time on the delay timer expires, the IMS receives a session interrupt request message sent by a PCRF unit, releases the IMS access leg, and performs voice service bearer resource deletion.

By now, an IMS side process in an SRVCC process is completed, that is, the IMS does not send a session termination message to a gateway device, and does not initiate a voice service bearer deletion process.

In the SRVCC process, an EPS network side process includes:

b701 to b707: refer to b301 to b307; and b708 to b711: refer to b309 to b312 in FIG. 3A to FIG. 3C.

b712. An MME sends a bearer deletion instruction message to a gateway device.

b713. The gateway device sends a credit control update request message to a PCRF.

The credit control update request message is used to notify the PCRF that the gateway device needs to delete a voice service bearer.

b714. The PCRF sends a credit control update answer message to the gateway device.

The PCRF sends the credit control update answer message to the gateway device, and agrees with the gateway device to delete the voice service bearer.

b715. The gateway device sends a bearer deletion request message to the MME.

The gateway device deletes a local voice service bearer, and sends the bearer deletion request message to the MME, to request the MME to delete a voice service bearer resource.

b716. The MME sends a bearer deletion response message to the gateway device.

After deleting a local voice service bearer resource, the MME sends the bearer deletion response message to the gateway device. In this way, after the IMS starts the delay timer, during a delay process according to the delay timer, the voice service bearer deletion process is performed on the EPS side, and before the delay time set on the delay timer expires, the IMS receives the session interrupt request message sent by the policy and charging rules function PCRF unit, releases the IMS access leg, and does not perform the voice service bearer deletion process.

b717. The PCRF sends a session interrupt request message to the IMS.

Before the delay time on the delay timer expires, the PCRF sends the session interrupt request message to the IMS, where the message is used to notify the IMS device that SRVCC handover is completed.

For example, after the gateway device sends the credit control update request message to the PCRF in b713, the PCRF sends the session interrupt request message to the IMS.

There is no sequence between b717 to b718 and b715 to b716.

b718. The IMS sends a session interrupt answer message to the PCRF.

After receiving the session interrupt request message, the IMS performs voice service bearer resource deletion.

b719. Perform an optional packet-switched process.

Therefore, based on the technical solution provided in this embodiment of the present invention, in an SRVCC process, on an IMS side, an IMS starts a delay timer before releasing an IMS access leg, and during a delay process according to the delay timer, a voice service bearer deletion process is performed on an EPS side; before a delay time set on the delay timer expires, the IMS receives a session interrupt request message sent by a PCRF and releases the IMS access leg, and no voice service bearer deletion process is initiated on an IMS side afterwards. Therefore, in an SRVCC handover process, the voice service bearer deletion process is performed only on the EPS side, thereby avoiding a process conflict in SRVCC handover.

Figure 8:
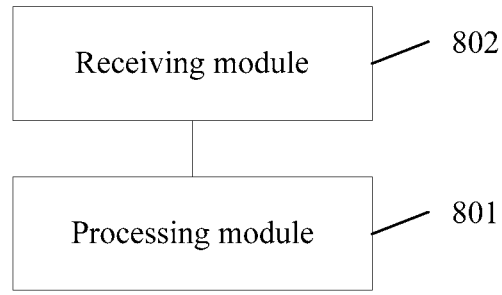
FIG. 8 shows a schematic block diagram of a single radio voice call continuity handover apparatus according to an embodiment of the present invention.

FIG. 8 shows a schematic block diagram of a single radio voice call continuity handover apparatus according to an embodiment of the present invention. The method may be executed by any proper apparatus, for example, executed by an MME; however, the present invention is not limited thereto. The apparatus provided in this embodiment of the present invention may execute the methods provided in the embodiments of the present invention shown in FIG. 2 and FIG. 3A to FIG. 3C.

As shown in FIG. 8, the apparatus includes: a processing module 801 and a receiving module 802.

The processing module 801 is configured to record whether a bearer deletion request message sent by a gateway device is received.

In an SRVCC process, a main process on an IMS side includes: an IMS completes session handover, releases an IMS side access leg resource, and sends a session termination message to a PCRF; the PCRF sends a re-authentication request message to the gateway device, where the message is used to instruct the gateway device to delete a voice bearer; further, the gateway device sends a bearer deletion request to the MME. In this case, the MME locally records a state indicating whether the bearer deletion request message is received, and sets an initial state: if the bearer deletion request message is not received, the initial state is recorded as false; or if the bearer deletion request message is received by the MME, the MME records the state as true. This embodiment of the present invention imposes no limitation on setting of the state.

The receiving module 802 is configured to receive a prompt message that is sent by a MSC and indicates completion of handover from packet-switched to circuit-switched.

The processing module 801 is further configured to: after the receiving module receives the prompt message that is sent by the MSC and indicates the completion of the handover from packet-switched to circuit-switched, if determining that the bearer deletion request message is received by the apparatus, a bearer deletion instruction message is not sent to the gateway device, and a local voice service bearer resource is not deleted.

For example, after the receiving module receives the prompt message that is sent by the MSC and indicates the completion of the handover from packet-switched to circuit-switched, if determining that the bearer deletion request message is received by the apparatus, the processing module 801 does not instruct a sending module in the apparatus to send the bearer deletion instruction message to the gateway device.

In the SRVCC process, the MME in an EPS network receives the prompt message indicating the completion of the handover from packet-switched to circuit-switched, and determines, according to whether the bearer deletion request message is received, whether to send the bearer deletion instruction message to the gateway device and delete the local voice service bearer resource. When the state is recorded as true, the MME does not send the bearer deletion instruction message to the gateway device, and deletes the local voice service bearer resource. In this way, after receiving the bearer deletion request message sent by the gateway device, the MME deletes a voice service bearer resource, and the MME does not send the bearer deletion instruction message to the gateway device afterwards, thereby avoiding a conflict in an SRVCC process.

In another embodiment of the present invention, the receiving module 802 is further configured to receive the bearer deletion request message sent by the gateway device; the processing module 801 is further configured to: send a bearer deletion response message to the gateway device, and the local voice bearer resource is not deleted.

For example, if the receiving module 802 is further configured to receive the bearer deletion request message sent by the gateway device, the processing module 801 instructs the sending module in the apparatus to send the bearer deletion response message to the gateway device.

That is, in a scenario in which the MME receives the bearer deletion request message sent by the gateway device, the MME records that the bearer deletion request message sent by the gateway device is received, and the MME sends the bearer deletion response message to the gateway device, and does not delete the local voice service bearer resource.

Optionally, in another embodiment of the present invention, the processing module 801 is further configured to: if determining that the bearer deletion request message is not received by the apparatus, an access bearer release request message is not sent to the gateway device, and the local voice service bearer resource is not deleted.

Therefore, based on the apparatus provided in this embodiment of the present invention, after receiving a prompt message indicating completion of handover from packet-switched to circuit-switched, an MME determines, according to whether a bearer deletion request message sent by a gateway device is received by the MME, whether to send a bearer deletion instruction message to the gateway device. In this way, after the MME performs voice service bearer deletion on an IMS side, no voice service bearer deletion process is performed on an EPS side, thereby avoiding a conflict in an SRVCC process.

The single radio voice call continuity handover apparatus in this embodiment of the present invention shown in FIG. 8 may correspond to the single radio voice call continuity handover methods provided in the embodiments of the present invention, and operations and/or functions of the modules of the apparatus provided in this embodiment of the present invention are separately used to implement corresponding processes of the methods in FIG. 2 to FIG. 7A to FIG. 7C. For brevity, details are not described herein again.

Figure 9:
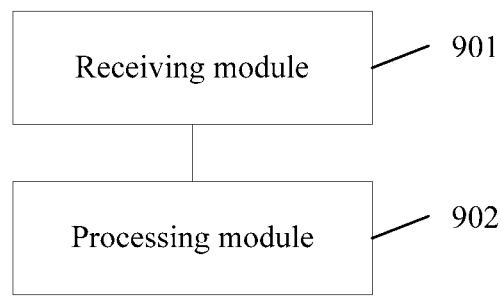
FIG. 9 shows a schematic block diagram of a single radio voice call continuity handover apparatus according to an embodiment of the present invention.

FIG. 9 shows a schematic block diagram of a single radio voice call continuity handover apparatus according to an embodiment of the present invention. The method may be executed by any proper apparatus, for example, executed by a PCRF; however, the present invention is not limited thereto. The apparatus provided in this embodiment of the present invention may execute the methods provided in the embodiments of the present invention shown in FIG. 4 and FIG. 5A to FIG. 5C.

As shown in FIG. 9, the apparatus includes:

a receiving module 901, configured to receive a session termination request message sent by an IMS, where the session termination request message includes an information element used to indicate that a reason for session termination is on-hook or SRVCC handover completion; and a processing module 902, configured to: if determining that the reason for session termination is SRVCC handover completion, a re-authentication request message is not sent to a gateway device.

For example, the processing module 902 determines that the reason for session termination is SRVCC handover completion, and does not instruct a sending module to send the re-authentication request message to the gateway device.

Optionally, in another embodiment of the present invention, the processing module 902 is further configured to: if determining that the reason for session termination is on-hook, send the re-authentication request message to the gateway device. For example, if the processing module 902 determines that the reason for session termination is on-hook, the sending module is instructed to send the re-authentication request message to the gateway device.

Based on the apparatus provided in this embodiment of the present invention, when an SRVCC handover process is performed, on the basis that a received session termination request message includes an information element used to indicate a reason for session termination, if a PCRF determines that the reason for session termination is SRVCC handover, the PCRF does not send a re-authentication request message to a gateway device. That is, no voice service bearer deletion process is performed on an IMS side, thereby avoiding a process conflict in SRVCC handover.

The single radio voice call continuity handover apparatus in this embodiment of the present invention shown in FIG. 9 may correspond to the single radio voice call continuity handover methods provided in the embodiments of the present invention, and operations and/or functions of the modules of the apparatus provided in this embodiment of the present invention are separately used to implement corresponding processes of the methods in FIG. 2 to FIG. 7A to FIG. 7C. For brevity, details are not described herein again.

Figure 10:
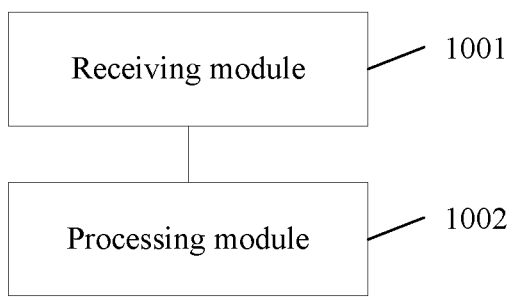
FIG. 10 shows a schematic block diagram of a single radio voice call continuity handover apparatus according to an embodiment of the present invention.

FIG. 10 shows a schematic block diagram of a single radio voice call continuity handover apparatus according to an embodiment of the present invention. The method may be executed by any proper apparatus, for example, executed by an IMS; however, the present invention is not limited thereto. The apparatus provided in this embodiment of the present invention may execute the methods provided in the embodiments of the present invention shown in FIG. 6 and FIG. 7A to FIG. 7C.

As shown in FIG. 10, the apparatus includes:

a receiving module 1001, configured to receive an initial session handover message sent by a MSC; and a processing module 1002, configured to: after the initial session handover message is received, perform session handover and remote leg update, and start a delay timer.

Specifically, in common SRVCC handover, the delay timer is configured on an SCC application server SCC AS of the apparatus; or in emergency SRVCC handover, the delay timer is configured on an EATF unit of the apparatus.

A delay time on the delay timer is greater than or equal to 8 seconds.

The receiving module 1001 is further configured to: before the delay time on the delay timer expires, receive a session interrupt request message sent by a PCRF unit; and the processing module 1002 is further configured to: after the session interrupt request message is received, release an IMS access leg.

Therefore, based on the apparatus provided in this embodiment of the present invention, in an SRVCC process, on an IMS side, an IMS starts a delay timer before releasing an IMS access leg; during a delay process according to the delay timer, a voice service bearer deletion process is performed on an EPS side; before a delay time set on the delay timer expires, the IMS receives a session interrupt request message sent by a PCRF unit, releases the IMS access leg, and does not perform the voice service bearer deletion process. Therefore, in the SRVCC handover process, the voice service bearer deletion process is performed only on the EPS side, thereby avoiding a process conflict in SRVCC handover.

The single radio voice call continuity handover apparatus in this embodiment of the present invention shown in FIG. 10 may correspond to the single radio voice call continuity handover methods provided in the embodiments of the present invention, and operations and/or functions of the modules of the apparatus provided in this embodiment of the present invention are separately used to implement corresponding processes of the methods in FIG. 2 to FIG. 7A to FIG. 7C. For brevity, details are not described herein again.

Figure 11:
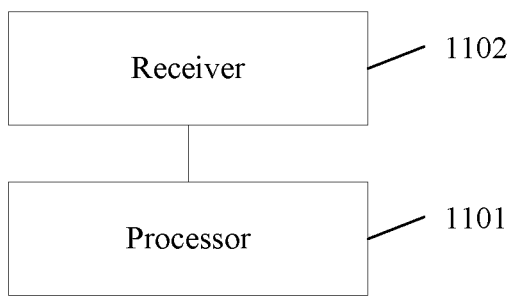
FIG. 11 shows a schematic block diagram of a single radio voice call continuity handover apparatus according to an embodiment of the present invention.

FIG. 11 shows a schematic block diagram of a single radio voice call continuity handover apparatus according to an embodiment of the present invention. The method may be executed by any proper apparatus, for example, executed by an MME; however, the present invention is not limited thereto. The apparatus provided in this embodiment of the present invention may execute the methods provided in the embodiments of the present invention shown in FIG. 2 and FIG. 3A to FIG. 3C.

As shown in FIG. 11, the apparatus includes: a processor 1101 and a receiver 1102.

The processor 1101 is configured to record whether a bearer deletion request message sent by a gateway device is received.

In an SRVCC process, a main process on an IMS side includes: an IMS completes session handover, releases an IMS side access leg resource, and sends a session termination message to a PCRF; the PCRF sends a re-authentication request message to the gateway device, where the message is used to instruct the gateway device to delete a voice bearer; further, the gateway device sends a bearer deletion request to the MME. In this case, the MME locally records a state indicating whether the bearer deletion request message is received, and sets an initial state: if the bearer deletion request message is not received, the initial state is recorded as false; or if the bearer deletion request message is received by the MME, the MME records the state as true. This embodiment of the present invention imposes no limitation on setting of the state.

The receiver 1102 is configured to receive a prompt message that is sent by a MSC and indicates completion of handover from packet-switched to circuit-switched.

The processor 1101 is further configured to: after the receiving module receives the prompt message that is sent by the MSC and indicates the completion of the handover from packet-switched to circuit-switched, if determining that the bearer deletion request message is received by the apparatus, a bearer deletion instruction message is not sent to the gateway device, and a local voice service bearer resource is not deleted.

For example, after the receiving module receives the prompt message that is sent by the MSC and indicates the completion of the handover from packet-switched to circuit-switched, if determining that the bearer deletion request message is received by the apparatus, the processor 1101 does not instruct a sending module in the apparatus to send the bearer deletion instruction message to the gateway device.

In the SRVCC process, the MME in an EPS network receives the prompt message indicating the completion of the handover from packet-switched to circuit-switched, and determines, according to whether the bearer deletion request message is received, whether to send the bearer deletion instruction message to the gateway device and delete the local voice service bearer resource. When the state is recorded as true, the MME does not send the bearer deletion instruction message to the gateway device, and deletes the local voice service bearer resource. In this way, after receiving the bearer deletion request message sent by the gateway device, the MME deletes a voice service bearer resource, and the MME does not send the bearer deletion instruction message to the gateway device afterwards, thereby avoiding a conflict in an SRVCC process.

In another embodiment of the present invention, the receiver 1102 is further configured to receive the bearer deletion request message sent by the gateway device; the processor 1101 is further configured to: send a bearer deletion response message to the gateway device, and the local voice bearer resource is not deleted.

Optionally, in another embodiment of the present invention, the processor 1101 is further configured to: if determining that the bearer deletion request message is not received by the apparatus, an access bearer release request message is not sent to the gateway device, and the local voice service bearer resource is not deleted.

For example, if the receiver 1102 is further configured to receive the bearer deletion request message sent by the gateway device, the processor 1101 instructs the sending module in the apparatus to send the bearer deletion response message to the gateway device.

Therefore, based on the apparatus provided in this embodiment of the present invention, after receiving a prompt message indicating completion of handover from packet-switched to circuit-switched, an MME determines, according to whether a bearer deletion request message sent by a gateway device is received by the MME, whether to send a bearer deletion instruction message to the gateway device. In this way, after the MME performs voice service bearer deletion on an IMS side, no voice service bearer deletion process is performed on an EPS side, thereby avoiding a conflict in an SRVCC process.

The single radio voice call continuity handover apparatus in this embodiment of the present invention shown in FIG. 11 may correspond to the single radio voice call continuity handover methods provided in the embodiments of the present invention, and operations and/or functions of the modules of the apparatus provided in this embodiment of the present invention are separately used to implement corresponding processes of the methods in FIG. 2 to FIG. 7A to FIG. 7C. For brevity, details are not described herein again.

It should be understood that in this embodiment of the present invention, the processor may be a central processing unit (CPU), or the processor may be another general-purpose processor, a digital signal processor (DSP), an application-specific integrated circuit (ASIC), a field programmable gate array (FPGA) or another programmable logic device, a discrete gate or a transistor logic device, a discrete hardware assembly, or the like. The general purpose processor may be a microprocessor, or the processor may also be any conventional processor, or the like.

In an implementation process, the foregoing steps may be completed by using an integrated logic circuit of hardware in the processor or an instruction in a form of software. The steps of the methods disclosed with reference to the embodiments of the present invention may be directly performed by a hardware processor, or may be performed by using a combination of hardware in the processor and a software module. The software module may be located in a mature storage medium in the field, such as a random access memory, a flash memory, a read-only memory, a programmable read-only memory or an electrically-erasable programmable memory, a register. The storage medium is located in the memory, and the processor reads information in the memory and completes the steps of the foregoing methods in combination with the hardware of the processor. To avoid repetition, details are not described herein.

Figure 12:
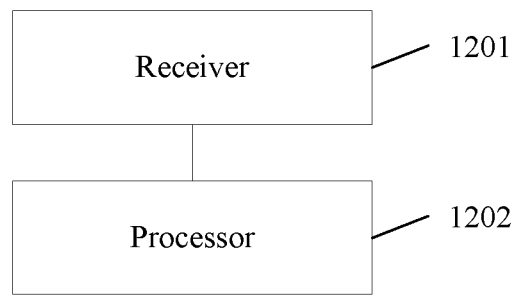
FIG. 12 shows a schematic block diagram of a single radio voice call continuity handover apparatus according to an embodiment of the present invention.

FIG. 12 shows a schematic block diagram of a single radio voice call continuity handover apparatus according to an embodiment of the present invention. The method may be executed by any proper apparatus, for example, executed by a PCRF; however, the present invention is not limited thereto. The apparatus provided in this embodiment of the present invention may execute the methods provided in the embodiments of the present invention shown in FIG. 4 and FIG. 5A to FIG. 5C.

As shown in FIG. 12, the apparatus includes:

a receiver 1201, configured to receive a session termination request message sent by an IMS, where the session termination request message includes an information element used to indicate that a reason for session termination is on-hook or SRVCC handover completion; and a processor 1202, configured to: if determining that the reason for session termination is SRVCC handover completion, a re-authentication request message is not sent to a gateway device.

For example, the processor 1202 determines that the reason for session termination is SRVCC handover completion, and does not instruct a sending module to send the re-authentication request message to the gateway device.

Optionally, in another embodiment of the present invention, the processor 1202 is further configured to: if determining that the reason for session termination is on-hook, send the re-authentication request message to the gateway device. For example, if the processor 1202 determines that the reason for session termination is on-hook, the sending module is instructed to send the re-authentication request message to the gateway device.

Based on the apparatus provided in this embodiment of the present invention, when an SRVCC handover process is performed, on the basis that a received session termination request message includes an information element used to indicate a reason for session termination, if a PCRF determines that the reason for session termination is SRVCC handover, the PCRF does not send a re-authentication request message to a gateway device. That is, no voice service bearer deletion process is performed on an IMS side, thereby avoiding a process conflict in SRVCC handover.

The single radio voice call continuity handover apparatus in this embodiment of the present invention shown in FIG. 12 may correspond to the single radio voice call continuity handover methods provided in the embodiments of the present invention, and operations and/or functions of the modules of the apparatus provided in this embodiment of the present invention are separately used to implement corresponding processes of the methods in FIG. 2 to FIG. 7A to FIG. 7C. For brevity, details are not described herein again.

In an implementation process, the foregoing steps may be completed by using an integrated logic circuit of hardware in the processor or an instruction in a form of software. The steps of the methods disclosed with reference to the embodiments of the present invention may be directly performed by a hardware processor, or may be performed by using a combination of hardware in the processor and a software module. The software module may be located in a mature storage medium in the field, such as a random access memory, a flash memory, a read-only memory, a programmable read-only memory or an electrically-erasable programmable memory, a register. The storage medium is located in the memory, and the processor reads information in the memory and completes the steps of the foregoing methods in combination with the hardware of the processor. To avoid repetition, details are not described herein.

Figure 13:
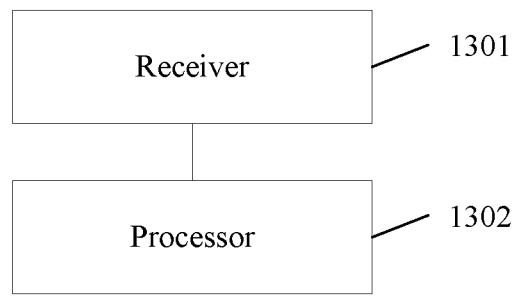
FIG. 13 shows a schematic block diagram of a single radio voice call continuity handover apparatus according to an embodiment of the present invention.

FIG. 13 shows a schematic block diagram of a single radio voice call continuity handover apparatus according to an embodiment of the present invention. The method may be executed by any proper apparatus, for example, executed by an IMS; however, the present invention is not limited thereto. The apparatus provided in this embodiment of the present invention may execute the methods provided in the embodiments of the present invention shown in FIG. 6 and FIG. 7A to FIG. 7C.

As shown in FIG. 13, the apparatus includes:

a receiver 1301, configured to receive an initial session handover message sent by a MSC; and a processor 1302, configured to: after the initial session handover message is received, perform session handover and remote leg update, and start a delay timer.

Specifically, in common SRVCC handover, the delay timer is configured on an SCC AS of the apparatus; or in emergency SRVCC handover, the delay timer is configured on an EATF unit of the apparatus.

A delay time on the delay timer is greater than or equal to 8 seconds.

The receiver 1301 is further configured to: before the delay time on the delay timer expires, receive a session interrupt request message sent by a PCRF unit; and the processor 1302 is further configured to: after the session interrupt request message is received, release an IMS access leg.

Therefore, based on the apparatus provided in this embodiment of the present invention, in an SRVCC process, on an IMS side, an IMS starts a delay timer before releasing an IMS access leg; during a delay process according to the delay timer, a voice service bearer deletion process is performed on an EPS side; before a delay time set on the delay timer expires, the IMS receives a session interrupt request message sent by a PCRF unit, releases the IMS access leg, and does not perform the voice service bearer deletion process. Therefore, in the SRVCC handover process, the voice service bearer deletion process is performed only on the EPS side, thereby avoiding a process conflict in SRVCC handover.

The single radio voice call continuity handover apparatus in this embodiment of the present invention shown in FIG. 13 may correspond to the single radio voice call continuity handover methods provided in the embodiments of the present invention, and operations and/or functions of the modules of the apparatus provided in this embodiment of the present invention are separately used to implement corresponding processes of the methods in FIG. 2 to FIG. 7A to FIG. 7C. For brevity, details are not described herein again.

It should be understood that in this embodiment of the present invention, the processor may be a central processing unit (CPU), or the processor may be another general-purpose processor, a digital signal processor (DSP), an application-specific integrated circuit (ASIC), a field programmable gate array (FPGA) or another programmable logic device, a discrete gate or a transistor logic device, a discrete hardware assembly, or the like. The general purpose processor may be a microprocessor, or the processor may also be any conventional processor, or the like.

In an implementation process, the foregoing steps may be completed by using an integrated logic circuit of hardware in the processor or an instruction in a form of software. The steps of the methods disclosed with reference to the embodiments of the present invention may be directly performed by a hardware processor, or may be performed by using a combination of hardware in the processor and a software module. The software module may be located in a mature storage medium in the field, such as a random access memory, a flash memory, a read-only memory, a programmable read-only memory or an electrically-erasable programmable memory, a register. The storage medium is located in the memory, and the processor reads information in the memory and completes the steps of the foregoing methods in combination with the hardware of the processor. To avoid repetition, details are not described herein.

A person of ordinary skill in the art may be aware that, in combination with the examples described in the embodiments disclosed in this specification, method steps and units may be implemented by electronic hardware, computer software, or a combination thereof. To clearly describe the interchangeability between the hardware and the software, the foregoing has generally described steps and compositions of each embodiment according to functions. Whether the functions are performed by hardware or software depends on particular applications and design constraint conditions of the technical solutions. A person of ordinary skill in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or the communication connections between the apparatuses may also be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments of the present invention.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The software product is stored in a storage medium and includes several instructions for instructing a computer device (which may be a personal computer, a server, or a network device) to perform all or a part of the steps of the methods described in the embodiments of the present invention. The foregoing storage medium includes: any medium that can store program code, such as a Universal Serial Bus (USB) flash drive, a removable hard disk, a read-only memory (ROM), a random access memory (RAM), a magnetic disk, or an optical disc.

The foregoing descriptions are merely exemplary embodiments of the present invention, but are not intended to limit the protection scope of the present invention. Any modification or replacement readily figured out by a person skilled in the art within the technical scope disclosed in the present invention shall fall within the protection scope of the present invention. Therefore, the protection scope of the present invention shall be subject to the protection scope of the claims. Additionally, statements made herein characterizing the invention refer to an embodiment of the invention and not necessarily all embodiments.

What is claimed is:

1. A voice service handover method for single radio voice call continuity (SRVCC), comprising:
    recording, by a mobility management entity (MME), a state indicating whether or not the MME has received a bearer deletion request from a gateway device in connection with an SRVCC process;
    receiving, by the MME, a prompt message from a mobile switching center (MSC), wherein the prompt message indicates completion of handover from packet-switched to circuit-switched; and
    after receiving the prompt message, determining, by the MME, whether or not the MME is to send a bearer deletion instruction message to the gateway device and is to delete a local voice service bearer resource based on the recorded state, wherein the MME determines that the MME is not to send the bearer deletion instruction message to the gateway device and is not to delete the local voice service bearer resource based on the recorded state indicating that the MME has received a bearer deletion request from the gateway device, so as to avoid a conflict with the SRVCC process.

2. The method according to claim 1, wherein the MME determines that the MME is to send the bearer deletion instruction message to the gateway device and is to delete the local voice service bearer resource based on the recorded state indicating that the MME has not received a bearer deletion request from the gateway device.

3. The method according to claim 1, wherein before recording the state indicating whether or not the MME has received a bearer deletion request message from the gateway device, the method further comprises: receiving, by the MME, the bearer deletion request message from the gateway device; and
    wherein the method further comprises: sending, by the MME, a bearer deletion response message to the gateway device.

4. A voice service handover apparatus for single radio voice call continuity (SRVCC), comprising a processor and a non-transitory computer-readable medium having processor-executable instructions stored thereon, the processor-executable instructions, when executed by the processor, facilitating:
    recording a state indicating whether or not a bearer deletion request message has been received from a gateway device in connection with an SRVCC process;
    receiving a prompt message from a mobile switching center (MSC), wherein the prompt messages indicates completion of handover from packet-switched to circuit-switched; and
    after receiving the prompt message, determining whether or not to send a bearer deletion instruction message to the gateway device and to delete a local voice service bearer resource based on the recorded state, wherein a first result of the determining is not to send the bearer deletion instruction message to the gateway device and not to delete the local voice service bearer resource based on the recorded state indicating that a bearer deletion request has been received from the gateway device, so as to avoid a conflict with the SRVCC process.

5. The apparatus according to claim 4, wherein a second result of the determining is to send the bearer deletion instruction message to the gateway device and to delete the local voice service bearer resource based on the recorded state indicating that a bearer deletion request has not been received from the gateway device.

6. The apparatus according to claim 4, wherein the processor-executable instructions, when executed, further facilitate:
   receiving the bearer deletion request message from the gateway device; and
   sending a bearer deletion response message to the gateway device.

* * * * *